United States Patent
Seo et al.

(10) Patent No.: US 12,514,882 B2
(45) Date of Patent: Jan. 6, 2026

(54) FAECALIBACTERIUM PRAUSNITZII STRAIN EB-FPDK11 AND USE THEREOF

(71) Applicant: ENTEROBIOME INC., Goyang-si (KR)

(72) Inventors: Jae Gu Seo, Gyeonggi-do (KR); Joo Hyun Shin, Seoul (KR); Do Kyung Lee, Seoul (KR)

(73) Assignee: ENTEROBIOME INC., Gyeonggi-Do (KR)

( * ) Notice: Subject to any disclaimer, the term of this patent is extended or adjusted under 35 U.S.C. 154(b) by 134 days.

(21) Appl. No.: 17/607,667

(22) PCT Filed: Jun. 26, 2020

(86) PCT No.: PCT/KR2020/008348
§ 371 (c)(1),
(2) Date: Oct. 29, 2021

(87) PCT Pub. No.: WO2021/261632
PCT Pub. Date: Dec. 30, 2021

(65) Prior Publication Data
US 2022/0323514 A1      Oct. 13, 2022

(30) Foreign Application Priority Data
Jun. 24, 2020   (KR) ................. 10-2020-0077336

(51) Int. Cl.
| | | |
|---|---|---|
| *A61K 35/741* | (2015.01) | |
| *A23L 33/135* | (2016.01) | |
| *A61P 1/16* | (2006.01) | |
| *A61P 29/00* | (2006.01) | |
| *C12N 1/20* | (2006.01) | |
| *C12R 1/01* | (2006.01) | |

(52) U.S. Cl.
CPC .......... *A61K 35/741* (2013.01); *A23L 33/135* (2016.08); *A61P 1/16* (2018.01); *A61P 29/00* (2018.01); *C12N 1/205* (2021.05); *A23V 2002/00* (2013.01); *C12R 2001/01* (2021.05)

(58) Field of Classification Search
CPC ..... A61P 29/00; C12N 1/205; A23V 2002/00; A23V 2200/324; A61K 35/74
See application file for complete search history.

(56) References Cited

U.S. PATENT DOCUMENTS

| | | | |
|---|---|---|---|
| 11,607,432 B2 * | 3/2023 | Berry ................. | A61K 9/19 |
| 2015/0044172 A1 | 2/2015 | Bicalho et al. | |
| 2016/0000838 A1 | 1/2016 | Harmsen et al. | |
| 2017/0348360 A1 | 12/2017 | Borody | |
| 2019/0015465 A1 * | 1/2019 | Possemiers ......... | A23L 33/135 |
| 2019/0030089 A1 | 1/2019 | Langella et al. | |
| 2021/0069262 A1 * | 3/2021 | Allen-Vercoe ...... | A61K 35/745 |
| 2021/0145897 A1 * | 5/2021 | Kawahara ............ | A61P 3/04 |

FOREIGN PATENT DOCUMENTS

| | | | |
|---|---|---|---|
| JP | 9-208479 | 8/1997 | |
| JP | 2016-511272 | 4/2016 | |
| JP | 2019-508486 | 3/2019 | |
| JP | 2019-520340 | 7/2019 | |
| KR | 10-2018-0070698 | 6/2018 | |
| KR | 10-2019-0086382 | 7/2019 | |
| WO | WO-2016075294 A1 * | 5/2016 | ........... A23L 33/135 |
| WO | 2017/072278 A1 | 5/2017 | |
| WO | 2017/072278 A8 | 5/2017 | |
| WO | 2018/230695 | 12/2018 | |

OTHER PUBLICATIONS

Hye Rim Byeonet. al. New Strains of Akkermansia muciniphila and Faecalibacterium prausnitzii are Effective for Improving the Muscle Strength of Mice with Immobilization-Induced Muscular Atrophy Journal of Medicinal Food Jun. 15, 2022. pp. 565-575 (Year: 2022).*
Harry Sokol et. al. Faecalibacterium prausnitzii is an anti-inflammatory commensal bacterium identified by gut microbiota analysis of Crohn disease patients. Oct. 2008. PNAS. 105 (43) 16731-16736 (Year: 2008).*
International Search Report issued Mar. 22, 2021 in International (PCT) Application No. PCT/KR2020/008348.
Munukka, E. et al., "*Faecalibacterium prausnitzii* treatment improves hepatic health and reduces adipose tissue. Inflammation in high-fat fed mice", The ISME Journal, 2017, vol. 11, pp. 1667-1679.
Ganesan, K. et al., "Causal Relationship between Diet-Induced Gut Microbiota Changes and Diabetes: A Novel Strategy to Transplant *Faecalibacterium prausnitzii* in Preventing Diabetes", International Journal of Molecular Sciences, 2018, vol. 19, 3720, 28 pages.
Notification of Reasons for Refusal issued Nov. 21, 2022 in corresponding Japanese Patent Application No. 2021-574236, with English language translation.
Katayama, K. et al., Examination of the significance of blood zinc in nitrogen metabolism in chronic liver disease. Liver, 2001, vol. 42, No. 3, pp. 120-125.
Ogata, A. IL-6 targeting in rheumatoid arthritis. Clin. Rheumatol. 2015, vol. 27, pp. 228-231. https://doi.org/10.14961/cra.27.228.
Usami, M. et al. Various Administration Methods of Butyrate and their Effects, Bulletin of Konan Women's University II, Mar. 2019, vol. 13, pp. 25-35, with English abstract.
Ferreira-Halder, C.V. et al., "Action and function of *Faecalibacterium prausnitzii* in health and disease", Best Practice & Research Clinical Gastroenterology, 2017, vol. 31, pp. 643-648.

(Continued)

Primary Examiner — Marsha Tsay
(74) Attorney, Agent, or Firm — Wenderoth, Lind & Ponack, L.L.P.

(57) ABSTRACT

The present disclosure relates to a novel *Faecalibacterium prausnitzii* EB-FPDK11 strain and the use thereof. Administration of a composition containing at least one selected from the group consisting of the *F. prausnitzii* EB-FPDK11 strain, a culture of the strain, a lysate of the strain, and an extract of the strain has the effects of preventing, ameliorating and treating inflammatory disease, liver disease or metabolic disease.

10 Claims, 16 Drawing Sheets

Specification includes a Sequence Listing.

(56) References Cited

OTHER PUBLICATIONS

Sokol, H. et al., "*Faecalibacterium prausnitzii* is an anti-inflammatory commensal bacterium identified by gut microbiota analysis of Crohn disease patients", Proceedings of the National Academy of Science, 2008, vol. 105, No. 43, pp. 16731-16736.

Benevidas, L. et al., "New Insights into the Diversity of the Genus *Faecalibacterium*", Frontiers in Microbiology, Sep. 2017, vol. 8, Article 1790, 13 pages.

Fitzgerald, C.B. et al., "Comparative analysis of *Faecalibacterium prausnitzii* genomes shows a high level of genome plasticity and warrants separation into new species-level taxa", BMC Genomics, 2018, vol. 19, No. 931, 20 pages.

Lopez-Siles, M. et al., "*Faecalibacterium prausnitzii*: from microbiology to diagnostics and prognostics", The ISME Journal, 2017, vol. 11, pp. 841-852.

Martín, R. et al., "Functional Characterization of Novel *Faecalibacterium prausnitzii* Strains Isolated from Healthy Volunteers: A Step Forward in the Use of *F. prausnitzii* as a Next-Generation Probiotic", Frontiers in Microbiology, Jun. 2017, vol. 8, Article 1226, 13 pages.

Song, H. et al., "*Faecalibacterium prausnitzii* subspecies-level dysbiosis in the human gut microbiome underlying atopic dermatitis", J Allergy Clin Immunol, 2015, vol. 137, No. 3, pp. 852-860.

Extended European Search Report issued Jun. 9, 2023 in European Application No. 20936077.5.

Martín, Rebeca et al., "*Faecalibacterium prausnitzii* prevents physiological damages in a chronic low-grade inflammation murine model", BMC Microbiology, 2015, vol. 15, No. 67, 12 pages.

Zhang, Mingming et al., "*Faecalibacterium prausnitzii* Inhibits Interleukin-17 to Ameliorate Colorectal Colitis in Rats", PLOS ONE, Oct. 2014, vol. 9, Issue 10, 10 pages.

Janda, J. Michael et al., "16S rRNA Gene Sequencing for Bacterial Identification in the Diagnostic Laboratory: Pluses, Perils, and Pitfalls", Journal of Clinical Microbiology, Sep. 2007, vol. 45, No. 9, pp. 2761-2764.

Bai, Zipeng et al., "Comprehensive analysis of 84 Faecalibacterium prausnitzii strains uncovers their genetic diversity, functional characteristics, and potential risks", Front. Cell. Infect. Microbiol. Jan. 2023, DOI: 10.3389/fcimb.2022.919701.

Martin, Rebeca et al., "Functional Characterization of Novel Faecalibacterium prausnitzii Strains Isolated from Healthy Volunteers: A Step Forward in the Use of F. prausnitzii as a Next-Generation Probiotic", Frontiers in Microbiology, Jun. 2017, vol. 8, Article 1226, 13 pages.

\* cited by examiner

A : *Faecalibacterium prausnitizii* DSM 17677ᵀ   B : *Faecalibacterium prausnitizii* EB-FPDK11

SEQUENCE LISTING

```
<160> NUMBER OF SEQ ID NOS: 24

<210> SEQ ID NO 1
<211> LENGTH: 1433
<212> TYPE: DNA
<213> ORGANISM: Artificial Sequence
<220> FEATURE:
<223> OTHER INFORMATION: Faecalibacterium prausnitzii EB-FPDK11 16S rRNA

<400> SEQUENCE: 1
gacgaacgct ggcggcgcgc ctaacacatg caagtcgaac gagcgagaga gagcttgctt      60
tctcgagcga gtggcgaacg ggtgagtaac gcgtgaggaa cctgcctcaa agaggggac      120 aacagttgga aacgactgct aataccgcat aagcccacag gtcggcatcg accagaggga     180
aaaggagcaa tccgctttga gatggcctcg cgtccgatta gctagttggt gaggtaacgg     240
cccaccaagg caacgatcgg tagccggact gagaggttga acggccacat tgggactgag    300
acacggccca gactcctacg ggaggcagca gtggggaata ttgcacaatg ggggaaaccc     360
tgatgcagcg acgccgcgtg gaggaagaag gtcttcggat tgtaaactcc tgttgttgag     420
gaagataatg acggtactca acaaggaagt gacggctaac tacgtgccag cagccgcggt     480
aaaacgtagg tcacaagcgt tgtccggaat tactgggtgt aaagggagcg caggcgggaa     540
gacaagttgg aagtgaaatc tatggctca acccataaac tgctttcaaa actgtttttc     600
ttgagtagtg cagaggtagg cggaattccc ggtgtagcgg tggaatgcgt agatatcggg     660
aggaacacca gtggcgaagg cggcctactg gcaccaact gacgctgagg ctcgaaagtg     720
tgggtagcaa acaggattag ataccctggt agtccacacc gtaaacgatg attactaggt     780
gttggaggat tgacccctc agtgccgcag ttaacacaat aagtaatcca cctggggagt     840
acgaccgcaa ggttgaaact caaaggaatt gacggggcc cgcacaagca gtggagtatg     900
tggtttaatt cgacgcaacg cgaagaacct taccaagtct tgacatccct tgacgaacat     960
agaaatgtgt tttctcttcg gagcaaggag acaggtggtc catggttgtc gtcagctcgt    1020
gtcgtgagat gttgggttaa gtcccgcaac gagcgcaacc cttactgtca gttactacgc    1080
aagaggactc tggcaggact gccgttgaca aaacggagga aggtggggat gacgtcaaat    1140
catcatgccc tttatgactt gggctacaca cgtactacaa tggcgttaaa caaagagaag    1200
caagaccgcg aggtggagca aaactcagaa acaacgtccc agttcggact gcaggctgca    1260
actcgcctgc acgaagtcgg aattgctagt aatcgtggat cagcatgcca cggtgaatac    1320
```

```
gttcccgggc cttgtacaca ccgcccgtca caccatgaga gccgggggga cccgaagtcg    1380
gtagtctaac cgcaaggagg acgccgccga aggtaaaact ggtgattggg gtg          1433
```

<210> SEQ ID NO 2
<211> LENGTH: 17
<212> TYPE: DNA
<213> ORGANISM: Artificial Sequence
<220> FEATURE:
<223> OTHER INFORMATION: FP1 Forward

<400> SEQUENCE: 2

```
actcaacaag gaagtga                                                    17
```

<210> SEQ ID NO 3
<211> LENGTH: 17
<212> TYPE: DNA
<213> ORGANISM: Artificial Sequence
<220> FEATURE:
<223> OTHER INFORMATION: FP2 Reverse

<400> SEQUENCE: 3

```
cagaggtagg cggaatt                                                    17
```

<210> SEQ ID NO 4
<211> LENGTH: 22
<212> TYPE: DNA
<213> ORGANISM: Artificial Sequence
<220> FEATURE:
<223> OTHER INFORMATION: ERIC-1 Forward

<400> SEQUENCE: 4

```
atgtaagctc ctggggattc ac                                              22
```

<210> SEQ ID NO 5
<211> LENGTH: 22
<212> TYPE: DNA
<213> ORGANISM: Artificial Sequence
<220> FEATURE:
<223> OTHER INFORMATION: ERIC-2 Reverse

<400> SEQUENCE: 5

```
aagtaagtga ctggggtgag cg                                              22
```

<210> SEQ ID NO 6
<211> LENGTH: 15
<212> TYPE: DNA
<213> ORGANISM: Artificial Sequence
<220> FEATURE:
<223> OTHER INFORMATION: (GTG)5 Forward/Reverse

<400> SEQUENCE: 6

```
gtggtggtgg tggtg                                                      15
```

<210> SEQ ID NO 7
<211> LENGTH: 20
<212> TYPE: DNA
<213> ORGANISM: Artificial Sequence
<220> FEATURE:
<223> OTHER INFORMATION: 27F Forward

<400> SEQUENCE: 7

```
agagtttgat cmtggctcag                                                 20
```

<210> SEQ ID NO 8

```
<211> LENGTH: 19
<212> TYPE: DNA
<213> ORGANISM: Artificial Sequence
<220> FEATURE:
<223> OTHER INFORMATION: 1492R Reverse

<400> SEQUENCE: 8
ggttaccttg ttacgactt                                                   19

<210> SEQ ID NO 9
<211> LENGTH: 24
<212> TYPE: DNA
<213> ORGANISM: Artificial Sequence
<220> FEATURE:
<223> OTHER INFORMATION: GAPDH Forward

<400> SEQUENCE: 9
gacatcaaga aggtggtgaa gcag                                             24

<210> SEQ ID NO 10
<211> LENGTH: 24
<212> TYPE: DNA
<213> ORGANISM: Artificial Sequence
<220> FEATURE:
<223> OTHER INFORMATION: GAPDH Reverse

<400> SEQUENCE: 10
ataccaggaa atgagcttga caaa                                             24

<210> SEQ ID NO 11
<211> LENGTH: 22
<212> TYPE: DNA
<213> ORGANISM: Artificial Sequence
<220> FEATURE:
<223> OTHER INFORMATION: IL-8 Forward

<400> SEQUENCE: 11
ttttgccaag gagtgctaaa ga                                               22

<210> SEQ ID NO 12
<211> LENGTH: 21
<212> TYPE: DNA
<213> ORGANISM: Artificial Sequence
<220> FEATURE:
<223> OTHER INFORMATION: IL-8 Reverse

<400> SEQUENCE: 12
aaccctctgc acccagtttt c                                                21

<210> SEQ ID NO 13
<211> LENGTH: 24
<212> TYPE: DNA
<213> ORGANISM: Artificial Sequence
<220> FEATURE:
<223> OTHER INFORMATION: GAPDH Forward

<400> SEQUENCE: 13
gacatcaaga aggtggtgaa gcag                                             24

<210> SEQ ID NO 14
<211> LENGTH: 24
<212> TYPE: DNA
<213> ORGANISM: Artificial Sequence
<220> FEATURE:
<223> OTHER INFORMATION: GAPDH Reverse

<400> SEQUENCE: 14
```

-continued ataccaggaa atgagcttga caaa                                          24

<210> SEQ ID NO 15
<211> LENGTH: 20
<212> TYPE: DNA
<213> ORGANISM: Artificial Sequence
<220> FEATURE:
<223> OTHER INFORMATION: C/EBPa Forward

<400> SEQUENCE: 15
agcaacgagt accgggtacg                                               20

<210> SEQ ID NO 16
<211> LENGTH: 21
<212> TYPE: DNA
<213> ORGANISM: Artificial Sequence
<220> FEATURE:
<223> OTHER INFORMATION: C/EBPa Reverse

<400> SEQUENCE: 16
tgtttggctt tatctcggct c                                             21

<210> SEQ ID NO 17
<211> LENGTH: 26
<212> TYPE: DNA
<213> ORGANISM: Artificial Sequence
<220> FEATURE:
<223> OTHER INFORMATION: aP2 Forward

<400> SEQUENCE: 17
agtgaaaact tcgatgatta catgaa                                        26

<210> SEQ ID NO 18
<211> LENGTH: 19
<212> TYPE: DNA
<213> ORGANISM: Artificial Sequence
<220> FEATURE:
<223> OTHER INFORMATION: aP2 Reverse

<400> SEQUENCE: 18
gcctgccact ttccttgtg                                                19

<210> SEQ ID NO 19
<211> LENGTH: 20
<212> TYPE: DNA
<213> ORGANISM: Artificial Sequence
<220> FEATURE:
<223> OTHER INFORMATION: FAS Forward

<400> SEQUENCE: 19
aggggtcgac ctggtcctca                                               20

<210> SEQ ID NO 20
<211> LENGTH: 20
<212> TYPE: DNA
<213> ORGANISM: Artificial Sequence
<220> FEATURE:
<223> OTHER INFORMATION: FAS Reverse

<400> SEQUENCE: 20
gccatgccca gagggtggtt                                               20

<210> SEQ ID NO 21
<211> LENGTH: 20
<212> TYPE: DNA

```
<213> ORGANISM: Artificial Sequence
<220> FEATURE:
<223> OTHER INFORMATION: ACC1 Forward

<400> SEQUENCE: 21
cctccgtcag ctcagataca                                           20

<210> SEQ ID NO 22
<211> LENGTH: 22
<212> TYPE: DNA
<213> ORGANISM: Artificial Sequence
<220> FEATURE:
<223> OTHER INFORMATION: ACC1 Reverse

<400> SEQUENCE: 22
tttactaggt gcaagccaga ca                                        22

<210> SEQ ID NO 23
<211> LENGTH: 20
<212> TYPE: DNA
<213> ORGANISM: Artificial Sequence
<220> FEATURE:
<223> OTHER INFORMATION: LPL Forward

<400> SEQUENCE: 23
ttgccctaag gacccctgaa                                           20

<210> SEQ ID NO 24
<211> LENGTH: 23
<212> TYPE: DNA
<213> ORGANISM: Artificial Sequence
<220> FEATURE:
<223> OTHER INFORMATION: LPL Reverse

<400> SEQUENCE: 24
acagagtctg ctaatccagg aat                                       23
```

FAECALIBACTERIUM PRAUSNITZII STRAIN EB-FPDK11 AND USE THEREOF

TECHNICAL FIELD

The present disclosure relates to a novel *Faecalibacterium prausnitzii* strain EB-FPDK11 and the use thereof.

BACKGROUND ART

Probiotics refer to all bacteria that exhibit beneficial effects in the body, including lactic acid bacteria, and are involved in various bodily functions against bowel diseases as well as immune diseases. For a while, the study that the effect is better when dietary fiber that is the food of probiotics, that is, probiotics, is taken together with the probiotics, has attracted attention. Recently, the assertion that postbiotics, which are metabolites released by probiotics, are effective as therapeutic agents or for diagnosis of diseases, has been attracting attention, and pharmabiotics have also been attracting attention. "Pharmabiotics" is a compound word of 'pharmaceutical' meaning medicine and 'probiotics' meaning live bacteria, refers to the human microbiome that may be used for medical purposes for disease care, and includes both probiotics and postbiotics.

Meanwhile, *Faecalibacterium* bacteria are obligate anaerobic bacilli that are always present in the intestinal mucus layer, and the retention rate and number thereof in humans are all high. In addition, these bacteria are major constituents of the intestinal flora.

Under this background, the present inventors have made efforts to develop a technology capable of curing diseases using strains harmless to the human body, and as a result, have identified a *Faecalibacterium prausnitzii* strain exhibiting an excellent anti-inflammatory effect and lipid accumulation inhibitory effect, and have found that the identified strain is suitable for the treatment of liver disease and colitis, thereby completing the present disclosure.

DISCLOSURE

Technical Problem

An object of the present disclosure is to provide a *Faecalibacterium prausnitzii* EB-FPDK11 strain (accession number: KCCM12621P)

Another object of the present disclosure is to provide a pharmaceutical composition for preventing or treating inflammatory disease, liver disease or metabolic disease, the pharmaceutical composition containing least one selected from the group consisting of the *F. prausnitzii* EB-FPDK11 strain, a culture of the *F. prausnitzii* EB-FPDK11 strain, a lysate of the strain, and an extract of the strain.

Still another object of the present disclosure is to provide a food composition for preventing or ameliorating inflammatory disease, liver disease or metabolic disease, the food composition containing at least one selected from the group consisting of the *F. prausnitzii* EB-FPDK11 strain, a culture of the *F. prausnitzii* EB-FPDK11 strain, a lysate of the strain, and an extract of the strain.

Technical Solution

One aspect of the present disclosure provides a *Faecalibacterium prausnitzii* EB-FPDK11 strain (accession number: KCCM12621P).

In one embodiment of the present disclosure, the *Faecalibacterium prausnitzii* EB-FPDK11 strain has the 16S rRNA sequence of SEQ ID NO: 1.

Another aspect of the present disclosure provides a pharmaceutical composition for preventing or treating inflammatory disease, the pharmaceutical composition containing at least one selected from the group consisting of the *F. prausnitzii* EB-FPDK11 strain, a culture of the *F. prausnitzii* EB-FPDK11 strain, a lysate of the strain, and an extract of the strain.

Still another aspect of the present disclosure provides a pharmaceutical composition for preventing or treating liver disease, the pharmaceutical composition containing at least one selected from the group consisting of the *F. prausnitzii* EB-FPDK11 strain, a culture of the *F. prausnitzii* EB-FPDK11 strain, a lysate of the strain, and an extract of the strain.

Yet another aspect of the present disclosure provides a pharmaceutical composition for preventing or treating metabolic disease, the pharmaceutical composition containing at least one selected from the group consisting of the *F. prausnitzii* EB-FPDK11 strain, a culture the *F. prausnitzii* EB-FPDK11 strain, a lysate of the strain, and an extract of the strain.

Still yet another aspect of the present disclosure provides a food composition for preventing or ameliorating inflammatory disease, the food composition containing at least one selected from the group consisting of the *F. prausnitzii* EB-FPDK11 strain, a culture of the *F. prausnitzii* EB-FPDK11 strain, a lysate of the strain, and an extract of the strain.

A further aspect of the present disclosure provides a food composition for preventing or ameliorating liver disease, the food composition containing at least one selected from the group consisting of the *F. prausnitzii* EB-FPDK11 strain, a culture of the *F. prausnitzii* EB-FPDK11 strain, a lysate of the strain, and an extract of the strain.

Another further aspect of the present disclosure provides a food composition for preventing or ameliorating metabolic disease, the food composition containing at least one selected from the group consisting of the *F. prausnitzii* EB-FPDK11 strain, a culture of the *F. prausnitzii* EB-FPDK11 strain, a lysate of the strain, and an extract of the strain.

According to one embodiment of the present disclosure, the food composition may be prepared in the form of a health functional food.

According to one embodiment of the present disclosure, the food composition may be prepared in the form of a probiotic formulation.

Advantageous Effects

Administration of a composition containing at least one selected from the group consisting of the *F. prausnitzii* EB-FPDK11 strain, a culture of the *F. prausnitzii* EB-FPDK11 strain, a lysate of the strain, and an extract of the strain has the effect of preventing, ameliorating or treating inflammatory disease, liver disease or metabolic disease.

BRIEF DESCRIPTION OF DRAWINGS

FIG. 6 is a graph showing the results of analyzing short-chain fatty acids in the *F. prausnitzii* standard strain and EB-FPDK11.

BEST MODE

Figure 1:
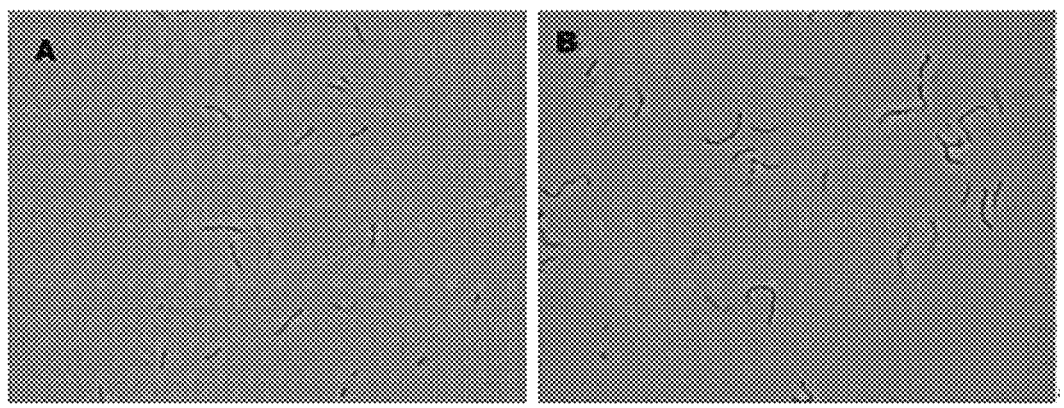
FIG. 1 shows microscopic observation of a *F. prausnitzii* standard strain and EB-FPDK11.

To achieve the above-described objects, one aspect of the present disclosure provides a *Faecalibacterium prausnitzii* EB-FPDK11 strain (accession number: KCCM12621P).

In one embodiment of the present disclosure, the *Faecalibacterium prausnitzii* EB-FPDK11 strain has the 16S rRNA sequence of SEQ. ID NO: 1.

The *Faecalibacterium prausnitzii* is one of the most abundant bacteria among the bacteria constituting the human intestinal flora, and is a non-motile Firmicutes. The *Faecalibacterium prausnitzii* is characterized in that it is extremely sensitive to oxygen, and thus does not grow even in the presence of a very small amount of oxygen.

Another aspect of the present disclosure provides a pharmaceutical composition for preventing or treating inflammatory disease, the pharmaceutical composition containing at least one selected from the group consisting of the *F. prausnitzii* EB-FPDK11 strain, a culture of the *F. prausnitzii* EB-FPDK11 strain, a lysate of the strain, and an extract of the strain.

As used herein, the term "culture" may refer to a composition obtained after completion of culturing, More specifically, the culture medium may or may not contain cells. Thus, the culture may include a culture supernatant, a composition from which the culture supernatant has been removed, or a composition obtained by concentrating the same, The composition the culture may further include, in addition to conventional components necessary for culturing *Faecalibacterium prausnitzii*, components that act synergistical on the growth of *Faecalibacterium prausnitzii*, and the composition including these components may be easily selected by those skilled in the art.

In addition, the strain may be in a liquid state or a dry state, and drying methods for the strain include, but are not limited to, air drying, natural drying, spray drying and freeze drying.

As used herein, the term "inflammatory disease" is a generic term for diseases having inflammation as a main lesion. For example, the inflammatory disease may be any one selected from the group consisting of inflammatory skin diseases, inflammatory bowel diseases such as Crohn's disease and ulcerative colitis, hepatitis, peritonitis, osteomyelitis, cellulitis, meningitis, encephalitis, pancreatitis, cystic fibrosis, stroke, acute bronchitis, bronchitis, arthritis, articular cell arteritis, hemochromatosis, sicklemia and other hemoglobinopathies, and sepsis, and may preferably be inflammatory skin disease, colitis, chronic bronchitis, hepatitis, or osteoarthritis, but is not limited thereto.

Still another aspect of the present disclosure provides a pharmaceutical composition for preventing or treating liver disease, the pharmaceutical composition containing at least one selected from the group consisting of the *F. prausnitzii* EB-FPDK11 strain, a culture of the *F. prausnitzii* EB-FPDK11 strain, a lysate of the strain, and an extract of the strain.

The liver disease includes liver fibrosis or cirrhosis, acute or chronic hepatitis, fatty liver or liver cancer, and may preferably be fatty liver or hepatitis, more preferably nonalcoholic steatohepatitis, but is not limited thereto.

In the present disclosure, preventing or treating the liver disease may refer to suppressing the weight of the liver from increasing abnormally, and may refer to suppressing the length and weight of the spleen from increasing abnormally. In addition, it may refer to controlling the concentration of triglycerides, cholesterol, GOT or GPT or suppressing the concentration from increasing abnormally, and inhibiting the formation of fat droplets in liver cells, fibrosis of the liver and the expression of α-SMA. However, the preventive and therapeutic effects of the pharmaceutical composition are not limited thereto.

Yet another aspect of the present disclosure provides a pharmaceutical composition for preventing or treating metabolic disease, the pharmaceutical composition containing at least one selected from the group consisting of the *F. prausnitzii* EB-FPDK11 strain, a culture of the *F. prausnitzii* EB-FPDK11 strain, a lysate of the strain, and an extract of the strain.

The metabolic disease may be hyperlipidemia, diabetes, gout, dementia, obesity, hypertension, hypoglycemia, hypercholesterolemia, hemochromatosis, amyloidosis, or porphyria. The diabetes may include type 1 diabetes and type 2 diabetes. Preferably, the metabolic disease may be obesity, but is not limited thereto.

The pharmaceutical composition used in the present disclosure should be used in a pharmaceutically effective amount. As used herein, the term "pharmaceutically effective amount" refers to an amount sufficient to treat a disease at a reasonable benefit/risk ratio applicable to any medical treatment. The effective dose level of the pharmaceutical composition may be determined depending on factors including the subject's type, disease severity, age and sex, the type of infected virus, the activity of the drug, sensitivity to the drug, the time of administration, the route of administration, excretion rate, the duration of treatment, and drugs used in combination with the composition, as well as other factors well known in the medical field. The effective amount may vary depending on the route of treatment, the use of excipients, and the potential for use with other drugs, as appreciated by those skilled in the art.

The pharmaceutical composition of the present disclosure may be prepared in a pharmaceutical dosage form using a method well known in the art so as to provide rapid, sustained or delayed release of the active ingredient after administration to mammals. In the preparation of the dosage form, the active ingredient is preferably mixed or diluted with a carrier or encapsulated into a carrier in the form of a container.

Accordingly, the pharmaceutical composition of the present disclosure may be formulated for use in oral dosage forms, such as powders, granules, tablets, capsules, suspensions, emulsions, syrups or aerosols, or in the form of external preparations and patches, according to conventional methods, and may further contain a suitable carrier, excipient or diluent which is commonly used in the preparation of compositions.

Examples of a carrier, excipient and diluent that may be contained in the pharmaceutical composition of the present disclosure include, but are not limited to, lactose, dextrose, sucrose, sorbitol, mannitol, erythritol, maltitol, starch, gum acacia, alginate, gelatin, calcium phosphate, calcium silicate, cellulose, methyl cellulose, microcrystalline cellulose, polyvinyl pyrrolidone, water, methylhydroxybenzoate, propylhydroxybenzoate, talc, magnesium stearate, and mineral oil. The formulation may be prepared using diluents or excipients such as a filler, an extender, a binder, a wetting agent, a disintegrating agent and a surfactant, which are commonly used.

Still yet another aspect of the present disclosure provides a food composition for preventing or ameliorating inflammatory disease, the food composition containing at least one selected from the group consisting of the *F. prausnitzii* EB-FPDK11 strain, a culture of the *F. prausnitzii* EB-FPDK11 strain, a lysate of the strain, and an extract of the strain.

A further aspect of the present disclosure provides a food composition for preventing or ameliorating liver disease, the food composition containing at least one selected from the group consisting of the *F. prausnitzii* EB-FPDK11 strain, a culture of the *F. prausnitzii* EB-FPDK11 strain, a lysate of the strain, and an extract of the strain.

Another further aspect of the present disclosure provides a food composition for preventing or ameliorating metabolic disease, the food composition containing at least one selected from the group consisting of the *F. prausnitzii* EB-FPDK11 strain, a culture of the *F. prausnitzii* EB-FPDK11 strain, a lysate of the strain, and an extract of the strain.

In the present disclosure, the food composition may be used in various forms, including pills, powders, granules, needles, tablets, capsules or liquids and solutions, and foods to which the composition of the present disclosure may be added include, for example, various foods, such as beverages, gums, teas, vitamin complexes, and health supplement foods.

There is no particular limitation on other ingredients, except that the food composition of the present disclosure contains, as an essential ingredient, the prausnitzii EB-FPDK11 strain, a culture of the *F. prausnitzii* EB-FPDK11 strain, a lysate of the strain, or an extract of the strain, or an active ingredient thereof or a physiologically acceptable salt thereof. Similar to common foods, the food composition may further contain additional ingredients such as various herbal extracts, food supplement additives or natural carbohydrates.

In addition, the food composition may further contain food supplement additives as mentioned above, and the food supplement additives include conventional food supplement additives known in the art, for example, flavoring agents, aromas, coloring agents, fillers, and stabilizers.

Examples the natural carbohydrates include monosaccharides such as glucose and fructose, disaccharides such as maltose and sucrose, polysaccharides such as dextrin and cyclodextrin, and sugar alcohols such as xylitol, sorbitol and erythritol. In addition to the ingredients described above, natural flavoring agents (e.g., rebaudioside A, glycyrrhizin, etc.) or synthetic flavoring agents (saccharin, aspartame, etc.) may be appropriately used as flavoring agents.

In addition to the ingredients described above, the food composition of the present disclosure may contain a variety of nutrients, vitamins, minerals (electrolytes) flavoring agents such as synthetic flavoring agents and natural flavoring agents, coloring agents and fillers (such as cheese or chocolate), pectic acid and salts thereof, alginic acid and salts thereof, organic acids, protective colloidal thickeners, pH-adjusting agents, stabilizers, preservatives, glycerin, alcohol, carbonizing agents used in carbonated beverages, and the like. In addition, the food composition may contain natural fruit juice and fruit flesh for the production of fruit juice beverages and vegetable beverages. These ingredients may be used alone or in combination.

According to one embodiment of the present disclosure, the food composition may be prepared in the form of a health functional food. As used herein, the term "health functional food" has the same meaning as "food for special health use (FoSHU)", and means a food having high pharmaceutical and medicinal effects, which is processed to efficiently exhibit bioregulatory functions in addition to nutrition supply. Here, the "functional food" means obtaining effects useful for health applications, such as nutrient control or physiological actions on the structures and functions of the human body. The food of the present disclosure may be prepared by a method commonly used in the art, and may be prepared by adding raw materials and ingredients which are commonly used in the art. In addition, any formulation of the food may also be prepared without limitation, as long as it is acceptable as food. The food composition of the present disclosure may be prepared into various types of formulations and has the advantages of being free from side effects that may occur upon long-term administration of drugs because it contains food as a raw material, unlike general drugs. In addition, owing to excellent portability thereof, the food composition of the present disclosure may be taken as a supplement for enhancing the effect of preventing or ameliorating inflammatory disease, liver disease or metabolic disease.

According to one embodiment of the present disclosure, the food composition may be prepared in the form of a prebiotic formulation.

The probiotic formulation may be prepared and administered in various dosage forms according to various methods known in the art. For example, the *Faecalibacterium prausnitzii* EB-FPDK11 strain of the present disclosure, a culture thereof, or a concentrate or dried product of the culture may be prepared and administered in the form of powders, liquids and solutions, tablets, capsules, syrups, suspensions or granules by mixing with carriers which are commonly used in the pharmaceutical field. Examples of the carriers include, but are not limited thereto, binders, lubricants, disintegrants, excipients, solubilizing agents, dispersants, stabilizers, suspending agents, colors and flavorings. In addition, the administration dosage of the probiotic formulation may be appropriately selected depending on the in vivo absorption rate, inactivation rate and excretion rate of the active ingredient, the subject's age, sex, type, condition and disease severity, etc.

Example 1: Isolation and Identification of *Faecalibacterium prausnitzii* EB-FPDK11 Strain 1.1. Acquisition and Isolation of *Faecalibacterium prausnitzii* Sample To isolate *Faecalibacterium prausnitzii* from feces of a healthy Korean (female, 9 years old, BMI 15.5), according to the method of Martin, the feces were cultured using YBHI medium [brain-heart infusion medium supplemented with 0.5% v yeast extract (Difco) 0.1% w/v D-cellobiose and 0.1% D-maltose], and then an extremely oxygen sensitive (ECS) strain was selected and isolated.

1.2. Microscopic Observation

In order to confirm whether the isolated strain would be a *Faecalibacterium prausnitzii* strain, the isolated strain was observed under a microscope. As a result, as shown in FIG. 1, it was confirmed that both a *Faecalibacterium prausnitzii* DSM 17677$^T$ strain as a standard strain (FIG. 1A) and the *Faecalibacterium prausnitzii* EB-FPDK11 strain observed at 1,000× magnification (FIG. 13) had a strait curved rod cell shape, and thus showed similar shapes.

1.3. PCR Analysis

Figure 2:
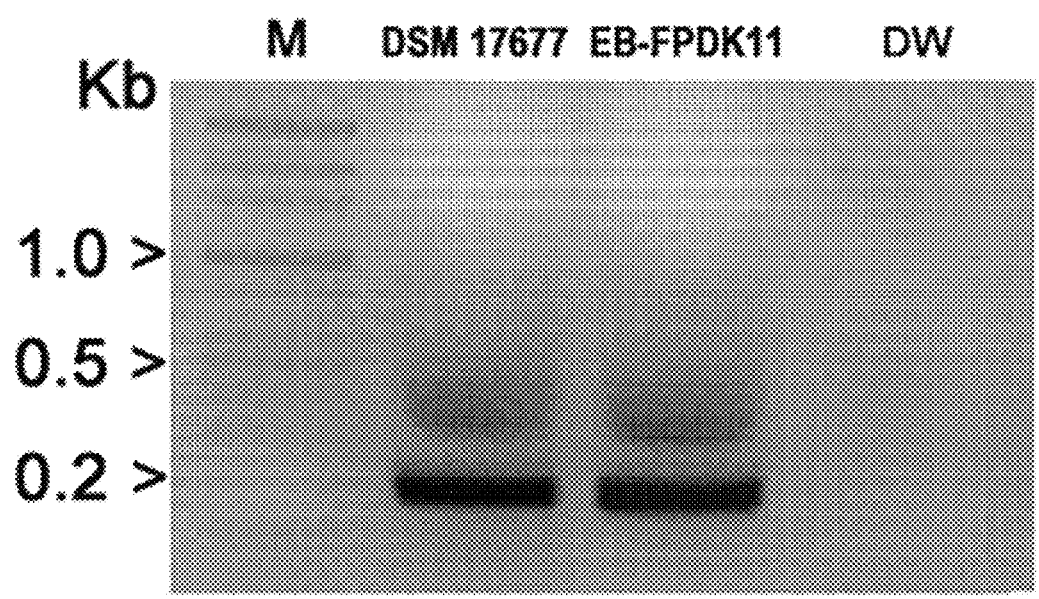
FIG. 2 shows the results of electrophoresis performed after PCR of the *F. prausnitzii* standard strain and EB-FPDK11 with FP-specific primers.

In order to confirm whether the isolated strain would be a *Faecalibacterium prausnitzii* strain, the isolated strain was subjected to PCR analysis using the FP-specific primers (SEQ ID NO: 2 and SEQ ID NO: 3) shown in Table 1 below. As a result, as shown in FIG. 2, it could be confirmed that the isolated strain showed bands similar to *Faecalibacterium prausnitzii* DSM17677$^T$ which is a positive control strain.

TABLE 1

| SEQ ID NO | Designation | Direction | Sequence (5'-3') | Amplicon size |
|---|---|---|---|---|
| SEQ ID NO: 2 | FP1 | Forward | ACT CAA CAA GGA AGT GA | 192 bp |
| SEQ ID NO: 3 | FP2 | Reverse | CAG AGG TAG GCG GAA TT | |

1.4. Random Amplified Polymorphic DNA (RAPD) Analysis

Figure 3:
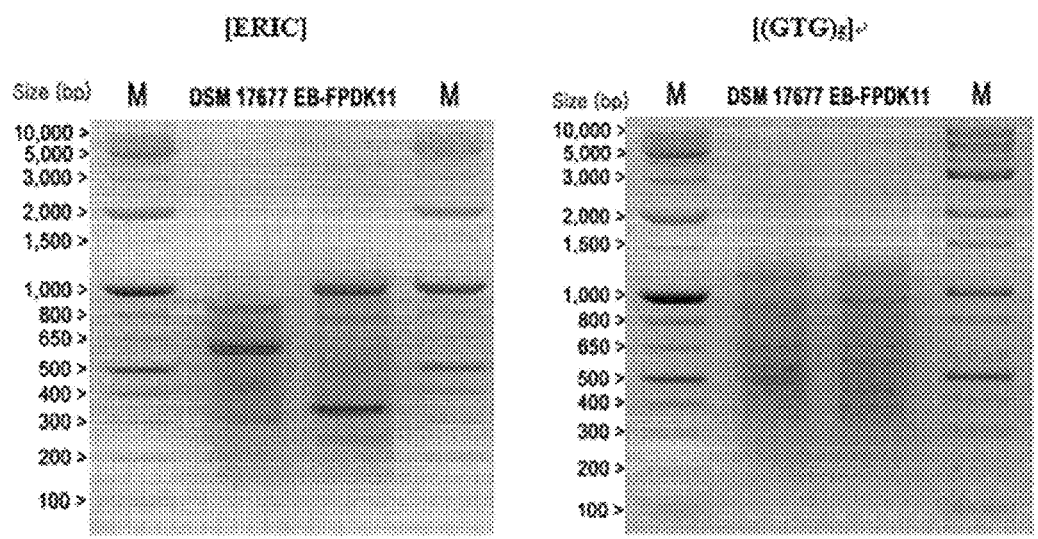
FIG. 3 shows the results of electrophoresis performed after PCR of the *F. prausnitzii* standard strain and EB-FPDK11 with ERIC-1, ERIC-2 and (GTG)$_5$ primers.

In order to check whether the strain isolated as described above is different from the previously reported standard strain of the same species, Random Amplified Polymorphic DNA (RAPD) analysis, which is a kind of molecular typing, was performed. To this end, genomic DNA (gDNA) extracted from the cells was amplified using the universal primers (SEQ ID NO: 4 to SEQ ID NO: 6) shown in Table 2 below, and then electrophoresed on 1% agarose gel for 90 minutes. Then, as shown in FIG. 3, DNA fragment patterns were compared using a UV transilluminator.

TABLE 2

| SEQ ID NO | Designation | Direction | Sequence (5'-3') |
|---|---|---|---|
| SEQ ID NO: 4 | ERIC-1 | Forward | ATG TAA GCT CCT GGG GAT TCA C |
| SEQ ID NO: 5 | ERIC-2 | Reverse | AAG TAA GTG ACT GGG GTG AGC G |
| SEQ ID NO: 6 | (GTG)$_5$ | Forward/Reverse | GTG GTG GTG GTG GTG |

MODE FOR INVENTION

Hereinafter, one or more embodiments will be described in more detail with reference to examples. However, these examples serve to illustrate one or more embodiments, and the scope of the present disclosure is not limited to these examples.

As a result of pattern comparison in FIG. 3, it was confirmed that the *Faecalibacterium prausnitzii* EB-FPDK11 strain showed band patterns, which are partially similar to but different from the standard strain DSM 17677$^T$, indicating that the *Faecalibacterium prausnitzii* EB-FPDK11 strain is of the same species as the standard strain *Faecalibacterium prausnitzii* DSM 17677$^T$ but is a strain different therefrom.

1.5. 16S rRNA BLAST

In order confirm whether the isolated strain would be a *Faecalibacterium prausnitzii* strain, the isolated strain was subjected to 16S rRNA sequencing and then analyzed by BLAST. As a result, the isolated strain was 99% or more identical to *Faecalibacterium prausnitzii* species. Based on these results, the isolated strain was named *Faecalibacterium prausnitzii* EB-FPDK11 strain, and deposited with the Korean Culture Center of Microorganisms (KCCM) under the accession number KCCM12621P.

1.6. Analysis of Phylogenetic Tree Using 16s rRNA Nucleotide Sequence

Figure 4:
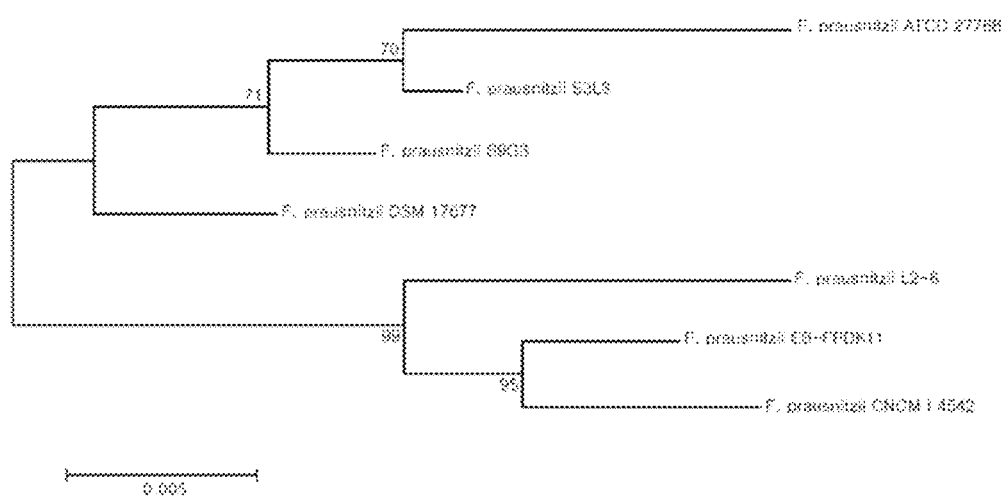
FIG. 4 is a phylogenetic tree prepared using the 16rRNA nucleotide sequence of *F. prausnitzii* EB-FPDK11.

As a result of the identification of the strain, strains similar to the currently known strains exist, but exactly consistent results were not obtained. Hence, phylogenetic tree analysis was performed. For full-length 16S rRNA gene sequencing of the isolated *Faecalibacterium prausnitzii* EB-FPDK11 strain, the 16S rRNA gene was amplified using the primers 27F (SE) ID NO: 7) and 14925 (SEQ ID NO: 8) shown in Table 3 below, and then the nucleotide sequence thereof was determined using 3730×1 DNA. Analyzer (Thermo Fisher Scientific, USA). A phylogenetic tree shown in FIG. 4 was prepared according to the Maximum Likelihood method using the obtained 16S rRNA gene sequences of EB-FPDK11 strain and the standard strain, as well as the previously published 16S rRNA gene sequences of other strains of the same species.

TABLE 3

| SEQ ID NO | Designation | Direction | Sequence (5'-3') | Amplicon size |
|---|---|---|---|---|
| SEQ ID NO: 7 | 27F | Forward | AGA GTT TGA TCM TGG CTC AG | 1,465 bp |
| SEQ ID NO: 8 | 1492R | Reverse | GGT TAC CTT GTT ACG ACT T | |

Example 2: Characterization of *Faecalibacterium prausnitzii* EB-FPDK11 Strain 2.1. Examination of Antimicrobial Susceptibility In order to examine the antimicrobial susceptibility of the *Faecalibacterium prausnitzii* EB-FPDK11 strain, the minimum inhibitory concentration (MTC) of each of antimicrobial agents piperacillin-tazobactam, ceftizoxime, chloramphenicol, clindamycin, meropenem, moxifloxacin, metronidazole, ciprofloxacin for anaerobes against the *Faecalibacterium prausnitzii* EB-FPDK11 strain were examined according to the liquid medium microdilution method of the Clinical & Laboratory Standard institute (CLSI) guidelines.

TABLE 4

| Anti-microbial agents | MIC$^a$ Breakpoints (µg/mL) | | | QC ATCC 29741$^b$ | Test strains DSM 17677$^T$ | Test strains EB-FPDK11 |
|---|---|---|---|---|---|---|
| | S | I | R | | | |
| PTZ | ≤32/4 | 64/4 | ≥128/4 | 8/4 | >256/4 (R) | >256/4 (R) |
| CTZ | ≤32 | 64 | ≥128 | 16 | 64 (I) | 128 (R) |
| CHL | ≤8 | 16 | ≥32 | 8 | 64 (R) | 8 (S) |
| CLI | ≤2 | 4 | ≥8 | 4 | ≤0.125 (S) | ≤0.125 (S) |
| MEM | ≤4 | 8 | ≥16 | 0.5 | >64 (R) | >64 (R) |
| MXF | ≤2 | 4 | ≥8 | 8 | 16 (R) | 32 (R) |
| MTZ | ≤8 | 16 | ≥32 | 2 | 4 (S) | 0.5 (S) |
| CIP | ≤1 | 2 | ≥4 | >32 | 32 (R) | 16 (R) |

PTZ: Piperacillin-tazobactam,
CTZ: ceftizoxime (3$^{rd}$ gen),
CHL: chloramphenicol,
CLI: clindamycin,
MEM: meropenem,
MXF: moxifloxacin (4$^{th}$ gen),
MTZ: metronidazole,
CIP: ciprofloxacin (2$^{nd}$ gen),
$^a$MIC: minimal inhibitory concentration,
$^b$Bacteroides thetaiotaomicron ATCC 29741

As a result, as can be seen from Table 4 above, the *Faecalibacterium prausnitzii* EB-FPDK11 strain of the present disclosure showed resistance to piperacillin-tazobactam (PTZ), ceftizoxime (CTZ), meropenem (MEM) and the fluoroquinolone-based antibiotics moxiproxacin (MXF) and ciprofloxacin (CIP), and showed susceptibility to chloramphenicol (CHL), clindamycin (CLI) and metronidazole (MTZ). The *Faecalibacterium prausnitzii* EB-FPDK11 strain showed a significant difference from the standard strain (DSM 17677$^T$) with respect to the antibiotic chloramphenicol (CHL), 2.2 Evaluation of Hemolytic Activity In order to verify the safety of the *Faecalibacterium prausnitzii* EB-FPDK11 strain, evaluation was made as to whether the strain has hemolytic activity. To this end, the strain was cultured using a blood agar medium prepared by adding 1.5% w/v bacto-agar and 5% w/v defibrinated sheep blood to YBHI medium (brain-heart infusion medium supplemented with 0.5% w/v yeast extract (Difco), 0.1% w/v D-cellobiose, and 0.1% w/v D-maltose), and then observation was made as to whether hemolysis would occur around the colonies. As a positive control, *Streptococcus pyogenes* ATCC 196155 causing β-homolysis was used for comparison.

Figure 5:
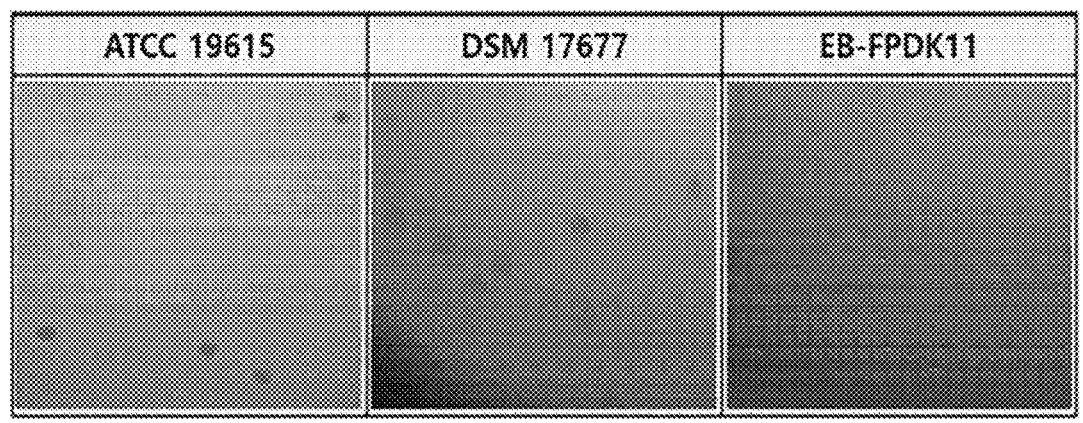

As a result, as shown in FIG. 5, both the *Faecalibacterium prausnitzii* EB-FPDK11 strain of the present disclosure and the standard strain DSM 17677$^T$ showed no clear zone around the colonies, suggesting that these strains do not cause β-hemolysis associated with pathogenicity.

2.3 Analysis of Functional Metabolites (Short-Chain Fatty Acids)

To analyze functional metabolites in the isolated *Faecalibacterium prausnitzii* EB-FPDK11 strain, the contents of short chain fatty acids (SCFAs) in a culture of the strain were analyzed by gas chromatography. To this end, the strain was cultured in YBHI medium (brain-heart infusion medium supplemented with 0.5% w/v yeast extract (Difco), 0.1% w/v D-cellobiose, and 0.1% w/v D-maltose) for 24 hours and then centrifuged at 12,000×g for 5 minutes. The supernatant was collected, filtered through a 0.2-μm syringe filter, and then used for analysis. Analysis was performed using gas chromatography (Agilent 7890N) equipped with an FFAP column (30 m×0.320 mm, 0.25 μm phase) under the conditions shown in Table 5 below

TABLE 5

| Flow | H$_2$: 40 mL/min, Air: 350 mL/min |
|---|---|
| Injector temp. | 240° C. |
| Detector temp. | 250° C. |
| Oven temp. | 40° C. (hold for 2 min) → 65° C./10 min (hold for 2 min) →240° C./10 min (hold for 5 min) |
| Injection vol. | 2 μL |
| Split ratio | 20:1 |

Figure 6:
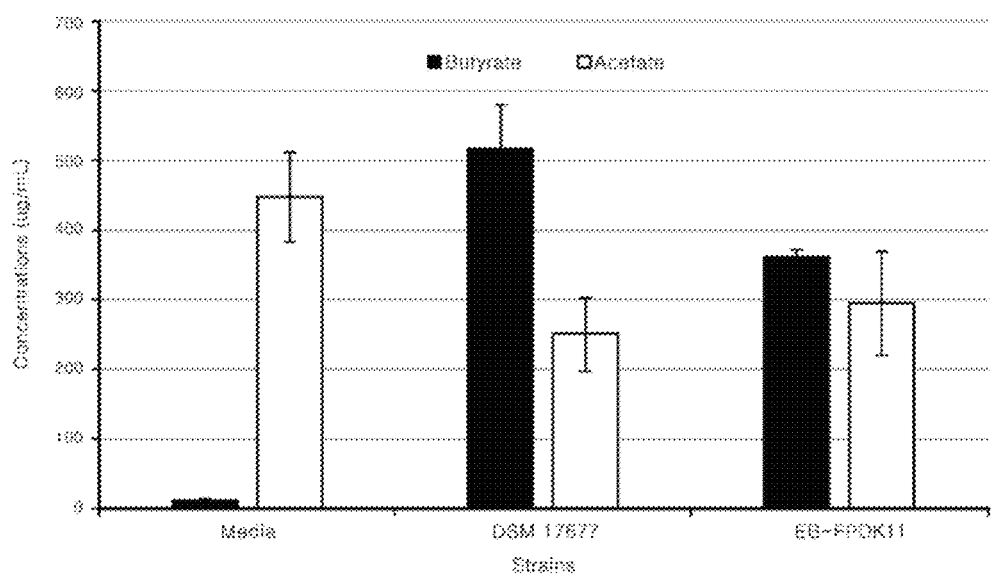
FIG. 6 shows the results of examining whether the *F. prausnitzii* standard strain and EB-FPDK11 cause hemolysis.

As a result of analyzing the functional short-chain fatty acids, as is seen from the graph in FIG. 6, it was confirmed that the *Faecalibacterium prausnitzii* EB-FPDK11 strain consumes acetate and produces butyrate.

Example 3: Evaluation of Anti-Inflammatory Effect of *Faecalibacterium prausnitzii* EB-FPDK11 Strain 3.1. Evaluation of Anti-inflammatory Effect in HT-29 Intestinal Epithelial Cells Since cytokines are involved in the regulation of inflammatory responses in inflammatory bowel disease, the *Faecalibacterium prausnitzii* EB-FPDK11 strain was administered and changes in cytokine gene expression were examined. In order to evaluate the anti-inflammatory effect by an in vitro experiment, HT-29 cells (ATCC® HTB-38', USA) as human colonic epithelial cells were cultured. Using McCoy's 5A modified media (Gibco, USA) supplemented with 10% FBS (fetal bovine serum, Hyclone, USA) and 10 μg/ml gentamicin as a basal culture medium, the cells were cultured in an incubator (NUAIRE, USA) at 37° C. under 5% CO$_2$. In order to confirm whether the *Faecalibacterium prausnitzii* EB-FPDK11 strain inhibits the LPS-induced expression of the inflammatory cytokine IL-8 gene in HT-29 cells, real-time PCR was performed using the primers (SEQ It) NOs: 9 to 12) shown in Table 6 below.

TABLE 6

| SEQ ID NO | Target | | Primer Sequence |
|---|---|---|---|
| SEQ ID NO: 9 | GAPDH | F: | 5'-GAC ATC AAG AAG GTG GTG AAG CAG-3' |
| SEQ ID NO: 10 | GAPDH | R: | 5'-ATA CCA GGA AAT GAG CTT GAC AAA-3' |
| SEQ ID NO: 11 | IL-8 | F: | 5'-TTT TGC CAA GGA GTG CTA AAG A-3' |
| SEQ ID NO: 12 | IL-8 | R: | 5'-AAC CCT CTG CAC CCA GTT TTC-3' |

Total RNA was extracted using TRI reagent (Sigma, USA), and for cDNA synthesis, 1 μg of RNA was synthesized into cDNA by the M-MLV cDNA synthesis k (Enzynomics, Korea). Real-time PCR was performed using the Quant Studio 3 real time PCR system (Applied Biosystems, USA).

Expression of the inflammatory cytokine gene was analyzed using the SYBR Green TOPreal™ qPCR 2×PreMIX (Enzynomics, Korea), and GAPDH was used as an internal standard. PCR was performed under the following conditions: pre-incubation (for UDG) at 50° C. for 4 min and 95° C. for 10 min, and 40 cycles, each consisting of 95° C. for 15 sec and 60° C. for 1 min. Data was analyzed by delta CT method using a program built in QuantStudio Design & Analysis Software v1.4.3.

The results obtained in all experiments were calculated as the mean and standard deviation of each experimental group using the statistical program GraphPad Prism 7 (GraphPad software Inc, USA), and the difference between groups was analyzed using one-way ANOVA, Tukey's test. A p-value≤0.05 was considered significant. In some results, AUC (area under curve) was calculated.

Figure 7:
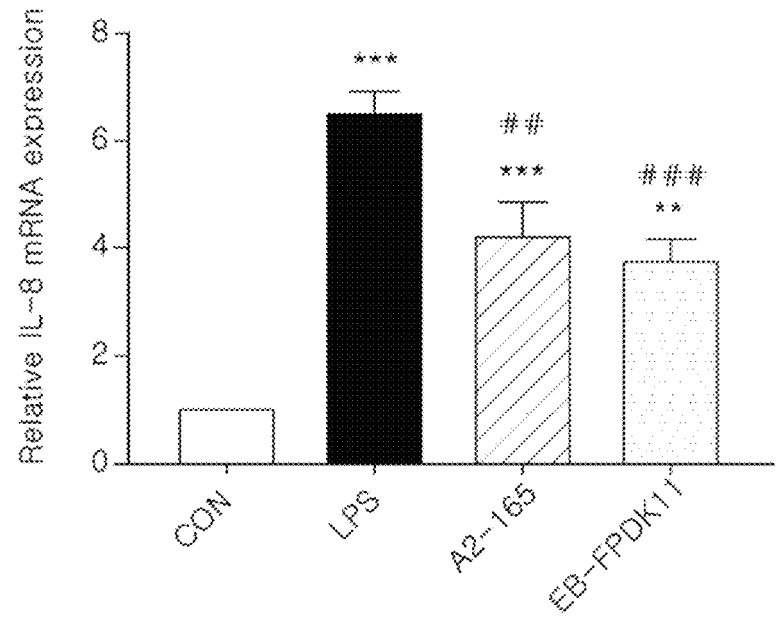
FIG. 7 is a graph showing the results of analyzing the mRNA expression of the inflammatory cytokine IL-8 in each of the *F. prausnitzii* standard strain and EB-FPDK11.

As a result, as shown in FIG. 7, when HT-29 cells were treated with LPS (100 μg/ml) alone for 6 hours, the expression of the representative inflammatory cytokine IL-8 in the cells increased in that in the normal group. However it was shown that the expression of IL-8 in the group treated with LPS together with a culture (10% v/v) of the *Faecalibacterium prausnitzii* A2-165 standard strain decreased compared to that in the LPS-treated group, and the expression of IL-8 in the group treated with LPS together with a culture of the *Faecalibacterium prausnitzii* EB-FPDK11 strain further decreased compared to that in the group treated with LPS and the A2-165 standard strain, Thus, it was confirmed that a culture of the *Faecalibacterium prausnitzii* EB-FPDK11 strain decreased the inflammatory cytokine IL-8.

3.2. Evaluation of Anti-inflammatory Effect in Mouse Bone Marrow-Derived Dendritic Cells To observe the anti-inflammatory response, the secretion of cytokines from dendritic cells (DC) was analyzed. To evaluate the anti-inflammatory effect of the strain using mouse bone marrow-derived dendritic cells (BMDCs), BMDCs were isolated. After a 0.5-ml microtube was punctured using an 18 G needle, the femur and tibia of a 6-week-old C57BL/6 mouse were isolated and placed in a 1.5-ml precipitation tube, and then centrifuged at 10,000×g for 15 seconds. The pellet in the 1.5 ml precipitation tube was washed three times with PBS, and then the pellet was added to RPMI-16.10 (10% FBS, 1% P/S, media, 1× mercaptoethanol, 20 μg GM-CSF) medium and cultured in a 150-mm culture dish. The next day, the BMDCs were transferred into and cultured in a 100-ml Petri dish, and on day 5, 10 ml of the culture was transferred into a 15-ml conical tube and then centrifuged at 1,000×g for 15 minutes. The supernatant was removed, and 10 ml of BMDC medium was added to the BMDCs and placed in a Petri dish. On day 6 or 7, the BMDCs were used in the experiment. To evaluate the anti-inflammatory effect of the *Faecalibacterium prausnitzii* EB-FPDK11 strain, the secretion of the representative anti-inflammatory cytokine IL-10 was analyzed by mIL-10 ELISA (Invitrogen, USA).

The BMDCs were treated with each of LPS (100 μg/ml), *P. coli*, the *Faecalibacterium prausnitzii* A2-165 standard and the EB-FPDK11 strain ($10^7$ cfu/ml, 10% v/v) for 1 hour in antibiotic-free medium, and then the medium was replaced with a medium containing penicillin/streptomycin antibiotics. Next, the cells were cultured for 24 hours, and the medium was centrifuged at 1,000×g. The secretion of IL-10 was measured using the supernatant by ELISA.

Figure 8:
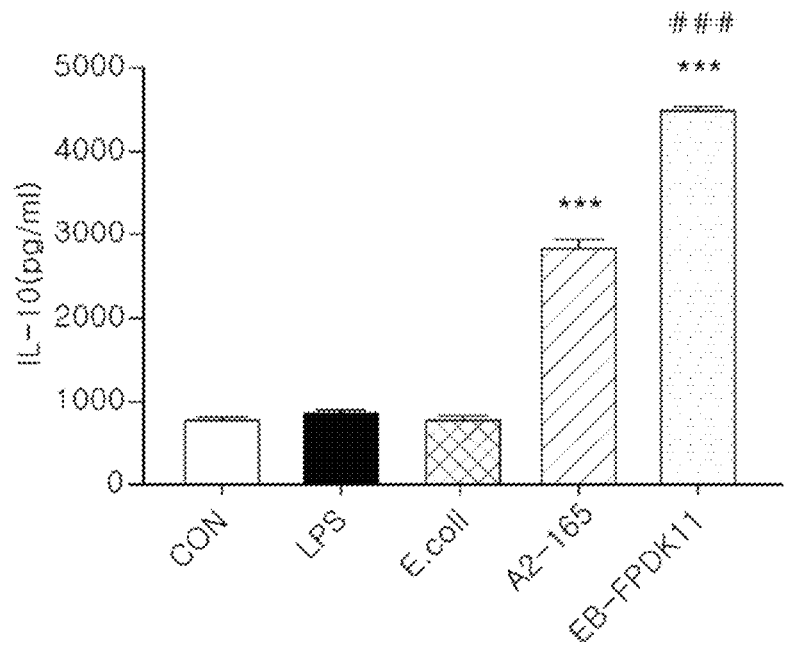
FIG. 8 is a graph showing the results of analyzing the concentration of the inflammatory cytokine IL-10 in each of the *F. prausnitzii* standard strain and EB-FPDK11.

As shown it FIG. 8, the secretion of IL-10 from the cells treated with each of LPS and *E. coli* was similar to that from the normal group without a difference. However, the group treated with the *Faecalibacterium prausnitzii* A2-165 standard strain showed a significant increase in the secretion of IL-10 compared to the normal group. The expression of IL-10 in the group treated with the *Faecalibacterium prausnitzii* EB-FPDK11 strain further increased to a significant level compared to that in the group treated with A2-165 standard strain. Thus, it was confirmed that treatment with the *Faecalibacterium prausnitzii* strain leads to a significant increase in the anti-inflammatory cytokine IL-10.

Example 4: Evaluation of Lipid Accumulation Inhibitory Effect

Examination was made as to whether e expression of lipid accumulation- and obesity-related biomarkers is affected by administration of the strain of the present disclosure.

4.1. Oil Red-O Staining of Differentiated Adipocytes

In order to examine the effect of the *Faecalibacterium prausnitzii* EB-FPDK11 strain of the present disclosure on adipocyte differentiation from 3T3-L1 cells and adipogenesis, an Oil Red-O (CRC) staining experiment was performed. First, in order to allow 3T3-L1 preadipocytes to differentiate into adipocytes, cells were dispensed in a 24-well plate at a density of $2\times10^4$ well. The cells were cultured in 10% FBS-containing DMEM medium for 4 days. When the cells reached a saturated state in the plate, the medium was replaced with differentiation medium [DMEM, 10% fetal bovine serum, 0.5 mM IBMX (3 isobutyl-1-methylxanthine, Sigma 15879), 1 µM dexamethasone (Sigma D4902, FW392.5), 10 mg/ml insulin], the cells were treated with 50 µl ($1\times10^7$ cells/well) of a sample (the *Faecalibacterium prausnitzii* strain or a culture thereof) and then cultured at 37° C. under 5% $CO_2$ for 2 days. Thereafter, the medium was replaced with insulin medium (10% FES, 10 mg/ml insulin) every two days, and the cells were cultured under the same conditions for 8 days. The cells were treated with the *Faecalibacterium prausnitzii* strain and a culture thereof at the same time whenever the medium was replaced. The cells were treated with the strain and a culture thereof ($10^7$ cfu/ml) at a concentration of 10% v/v.

Oil Red-O staining method is a method of staining differentiated 3T3-L1 cells with Oil Red-O reagent to measure fat generated the cells. 3T3-L1 cells (Korea Cell Line Bank, Korea) as mouse preadipocytes were cultured. Using DMEM (Dulbecco's Modified Eagle's Medium, Welgene, Korea) supplemented with 10% FBS (fetal bovine serum, Hyclone, USA) and 1% penicillin/streptomycin as a basal culture medium, the cells were cultured in a 5% $CO_2$ incubator (NUAIRE, USA) at 37° C. After adipocyte differentiation from the preadipocytes 3T3-L1 was induced by insulin (1 µg/ml), IBMX (0.5 mM) and dexamethasone (1 µM) for 10 days, the culture medium was removed by washing three times with PBS, and 10% formalin (Sigma, USA) was added to the cells which were then allowed to react with Oil Red-C (Oil red O, Sigma, USA) solution for 1 hour and washed with distilled water, thus staining lipid droplets.

After completion of cell staining, the cells were washed three times with 40% isopropanol (Duksan, Korea) and dried, and the size of lipid droplets in the cells was observed with an optical microscope. The adipocyte sample stained with Oil Red-C solution was melted by adding isopropanol thereto, and the absorbance at 500 nm was measured using a spectrophotometer (Epoch, BioTek, USA), and the results are shown in FIGS. 9 and 10.

Figure 9:
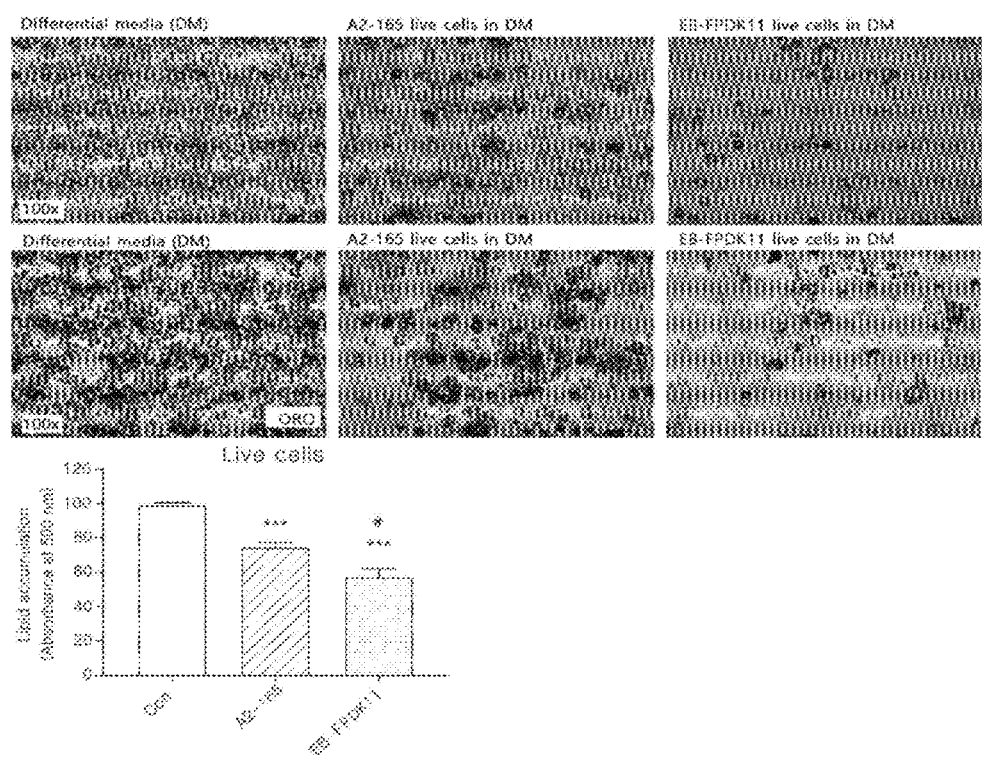
FIG. 9 depicts photographs and a graph, which show the results of examining the degree of inhibition of lipid accumulation by each of the *F. prausnitzii* standard strain and EB-FPDK11.

As shown in FIG. 9, as a result of treating 3T3-L1 cells with the *Faecalibacterium prausnitzii* A2-165 standard strain of the present disclosure during differentiation of the cells, lipid accumulation in the treated cells was inhibited compared to that in the control group. It was confirmed that treatment with the *Faecalibacterium prausnitzii* EB-FPDK11 strain more significantly inhibited lipid accumulation compared to that in the group treated with the *Faecalibacterium prausnitzii* A2-165 standard strain.

Figure 10:
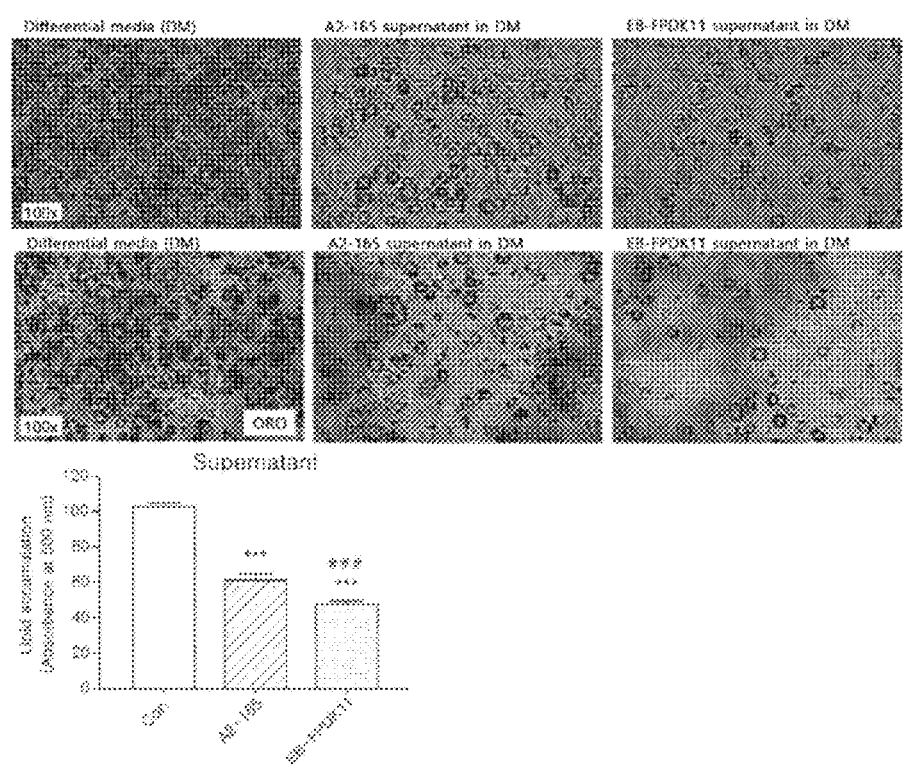
FIG. 10 depicts photographs and a graph, which show the results of examining the degree of inhibition of lipid accumulation by a culture of each of the *F. prausnitzii* standard strain and EB-FPDK11.

Similarly, as shown in FIG. 10, as a result of treating 3T3-L1 cells with a culture of the *Faecalibacterium prausnitzii* A2-165 standard strain during differentiation of the cells, lipid accumulation in the treated cells was significantly inhibited compared to that in the control group. Treatment with a culture of the *Faecalibacterium prausnitzii* EB-FPDK11 strain more significantly inhibited lipid accumulation compared to that in the group treated with a culture of the *Faecalibacterium prausnitzii* A2-165 standard strain.

As a result of the experiment, it was confirmed that the *Faecalibacterium prausnitzii* EB-FPDK11 strain and a culture thereof have a better effect on the inhibition of adipogenesis of 3T3-L1 cells than the *Faecalibacterium prausnitzii* A2-165 standard strain and a culture thereof.

4.2. Evaluation of Effect against Biomarker Gene Expression

In order to evaluate the effect of the strain on the inhibition of adipocyte differentiation, the mRNA expression levels of the transcription factor C/EEPα (CCAAT/enhancer binding protein alpha) and the lipogenesis genes aP2 (adipocyte protein 2), FAS (fatty acid synthase), ACC1 (acetyl-coenzyme A-carboxylase) and LPL (lipoprotein lipase), which are involved in adipocyte differentiation and maturation at the stage of adipocyte differentiation, were analyzed by performing real-time PCR using the gene-specific primers (SEQ ID NOs: 13 to 24) shown in Table 7 below.

TABLE 7

| SEQ ID NO | Target | | Primer sequence |
|---|---|---|---|
| SEQ ID NO: 13 | GAPDH | F: | 5'-GAC ATC AAG AAG GTG GTG AAG CAG-3' |
| SEQ ID NO: 14 | GAPDH | R: | 5'-ATA CCA GGA AAT GAG CTT GAC AAA-3' |
| SEQ ID NO: 15 | C/EBPα | F: | 5'-AGC AAC GAG TAC CGG GTA CG-3' |
| SEQ ID NO: 16 | C/EBPα | R: | 5'-TGT TTG GCT TTA TCT CGG CTC-3' |
| SEQ ID NO: 17 | aP2 | F: | 5'-AGT GAA AAC TTC GAT GAT TAC ATG AA-3' |
| SEQ ID NO: 18 | aP2 | R: | 5'-GCC TGC CAC TTT CCT TGT G-3' |
| SEQ ID NO: 19 | FAS | F: | 5'-AGG GGT CGA CCT GGT CCT CA-3' |
| SEQ ID NO: 20 | FAS | R: | 5'-GCC ATG CCC AGA GGG TGG TT-3' |
| SEQ ID NO: 21 | ACC1 | F: | 5'-CCT CCG TCA GCT CAG ATA CA-3' |
| SEQ ID NO: 22 | ACC1 | R: | 5'-TTT ACT AGG TGC AAG CCA GAC A-3' |
| SEQ ID NO: 23 | LPL | F: | 5'-TTG CCC TAA GGA CCC CTG AA-3' |
| SEQ ID NO: 24 | LPL | R: | 5'-ACA GAG TCT GCT AAT CCA GGA AT-3' |

Specifically, total RNA was extracted from the cell monolayer using TRI reagent (Sigma, USA) according to the manufacturer's instructions, and cDNA was synthesized from 1 µg of total. RNA using the M-MLV cDNA synthesis kit (Enzynomics, Korea). A PCR reaction was performed using the Quant Studio 3 real time PCR system Applied Biosystems, USA), The PCR was performed under the following conditions: pre-incubation at 50° C. for 4 min and 95° C. for 10 min, and 40 cycles, each consisting of 95° C. for 15 sec and 50° C. for 1 min, Data was analyzed by delta CT method using a program built in Quantstudio Design & Analysis Software v1.4.3.

Figure 11:
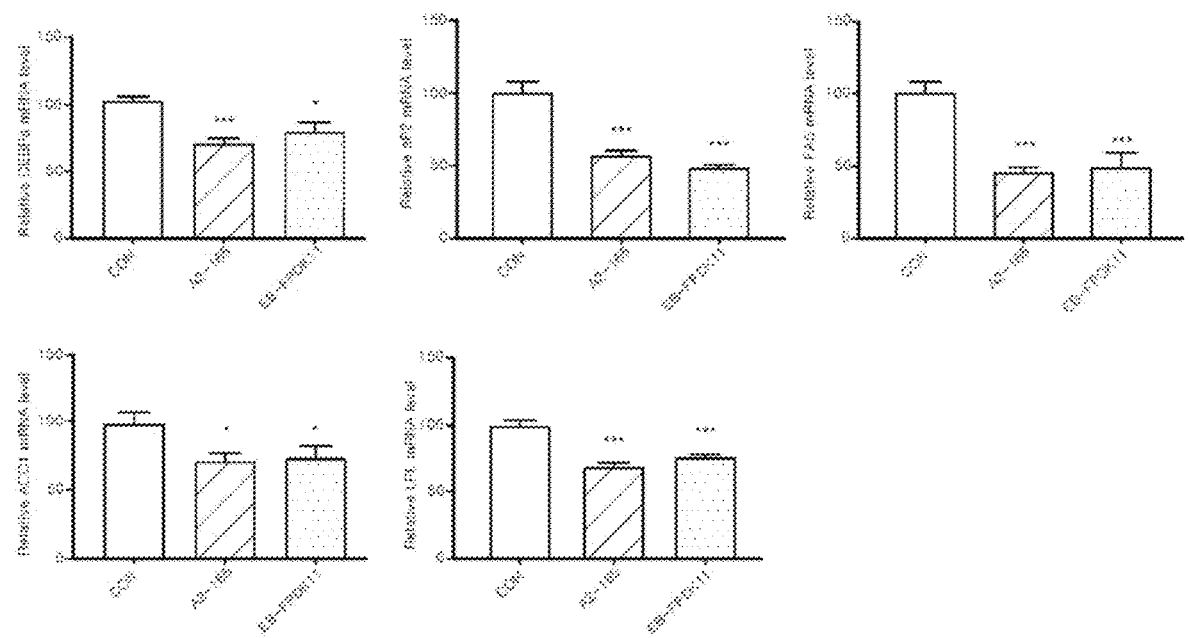
FIG. 11 depicts graphs showing the results of comparing and analyzing the expression levels of genes, which are involved in adipocyte differentiation, after induction of adipogenesis upon treatment with each of the *F. prausnitzii* standard strain and EB-FPDK11.

As shown in FIG. 11, when the increased expression levels of C/EBPa, aP2, FAS, ACC1 and LPL, which are genes involved in adipocyte differentiation, after induction of adipogenesis, were expressed as 100%, the expression levels of C/EEPα, aP2, FAS, ACC1 and LPL in the groups treated with each of the *Faecalibacterium prausnitzii* A2-165 standard strain and a culture of the *Faecalibacterium prausnitzii* EB-FPDK11 strain significantly decreased. It was confirmed that both the *Faecalibacterium prausnitzii* A2-165 standard strain and the *Faecalibacterium prausnitzii* EB-FPDK11 strain have an excellent effect of inhibiting the expression of adipogenesis-related genes in 3T3-L1 cells.

Example 5: Evaluation of Effect Against Nonalcoholic Steatohepatitis 5.1. Construction of Nonalcoholic Steatohepatitis Animal Model Animal experiments were conducted in compliance with the Animal Use and Care Protocol of the Institutional Animal Care and Use Committee (IACUC). As experimental animals, 8-week-old male C57BL/6 mice (9 mice per group) were purchased and acclimated for 1 week. Then, the mice were bred for 12 weeks. Regarding the breeding environment, the mice were acclimatized for 1 week at a constant temperature (22° C.) and relative humidity (40 to 60%) with a 12-hr light/12-hr dark cycle.

In order to induce nonalcoholic steatohepatitis, the mice were allowed to consume drinking water containing high-fat feed (60 kcal % fat; Research Diets Inc., NJ, USA) as an experimental diet (NASH) and 30% fructose for 16 weeks, and were allowed to access drinking water ad libitum.

The experimental mice were randomly divided into 5 groups as shown in Table 8 below.

TABLE 8

| | |
|---|---|
| Experimental group I (normal) | Normal diet normal control group |
| Experimental group II (HFD) | Group in which nonalcoholic steatohepatitis was induced by feeding experimental diet |
| Experimental group III (silymarin) | Group to which silymarin (30 mg/kg) was administered after induction of nonalcoholic steatohepatitis by feeding experimental diet |
| Experimental group IV | Group to which *Faecalibacterium prausnitzii* A2-165 standard strain was administered after induction of nonalcoholic steatohepatitis by feeding experimental diet |
| Experimental group V | Group to which *Faecalibacterium prausnitzii* EB-FPDK11 strain was administered after induction of nonalcoholic steatohepatitis by feeding experimental diet |

In the case of experimental groups III, IV and V, silymarin (30 mg/kg) or *Faecalibacterium prausnitzii* live cells at a concentration of $1\times10^8$ CFU/150 µl PBS (25% glycerol and 0.05% cysteine/PBS) were orally administered daily from 8 weeks after the induction of nonalcoholic steatohepatitis by the experimental diet.

The normal mice (Normal) were allowed to consume 10% fat feed. As a positive control, silymarin known as functional raw materials that can help ameliorate nonalcoholic fatty liver, or the *Faecalibacterium prausnitzii* A2-165 standard strain, was administered. At this time, the normal group and the experimental diet groups were orally administered the same amount of phosphate buffered saline (25% glycerol and 0.05% cysteine/PBS) daily in order to exclude the effect of stress or the like caused by administration.

5.2. Changes in Body Weight and Food Intake

Figure 12:
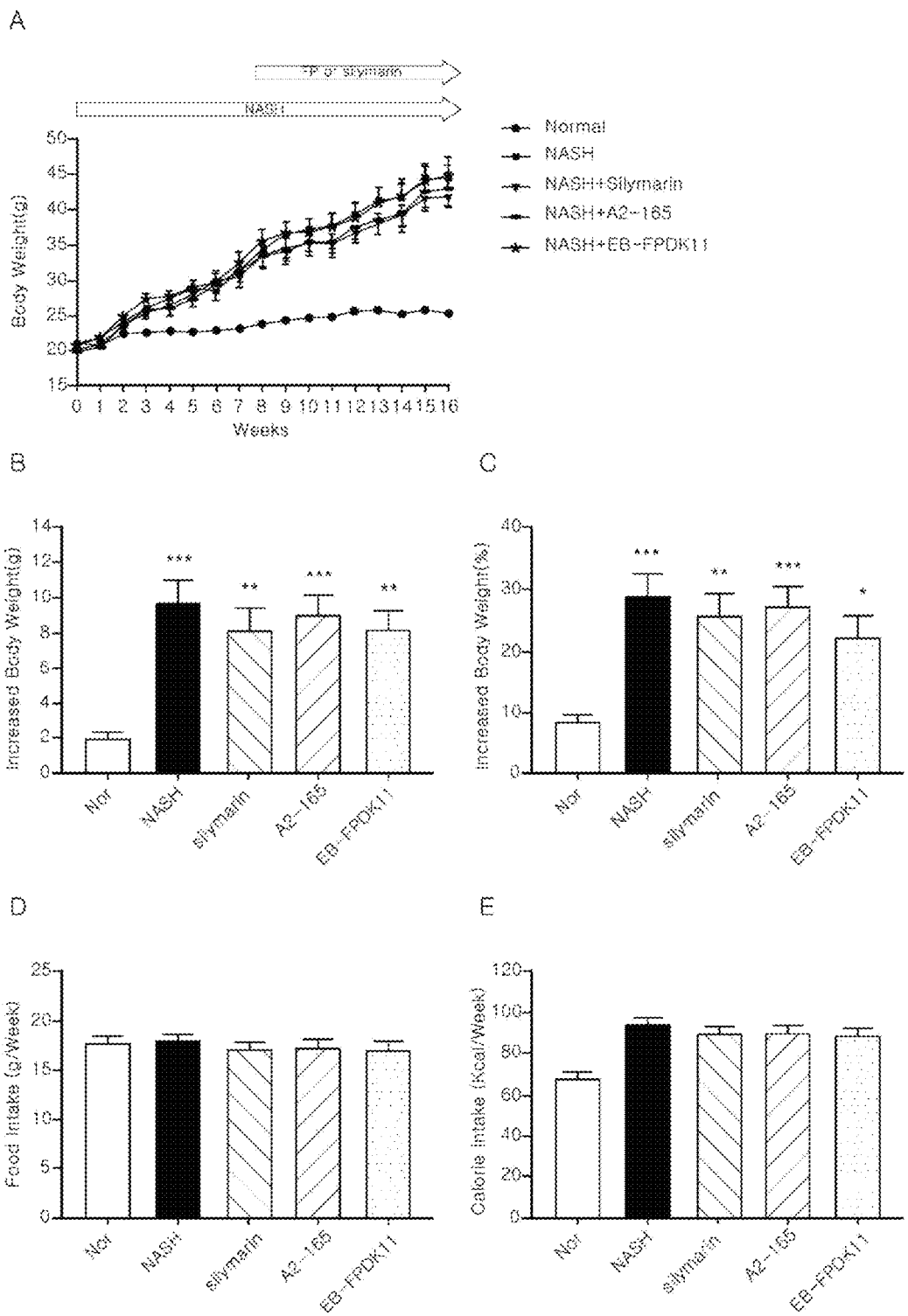
FIG. 12 depicts graphs comparing body weight and dietary intake between *F. prausnitzii* standard strain-administered mice and EB-FPDK11-administered mice in nonalcoholic steatohepatitis-induced mice.

16 Weeks after performing the nonalcoholic steatohepatitis induction experiment, changes in the body weights of the experimental groups were measured, and the results are shown in FIG. 12.

Referring to FIG. 12, the body weights of all the group animals with nonalcoholic steatohepatitis induced by the experimental diet increased compared to that of the normal diet group. When the weight gain during a period from week 8 (when silymarin or the *Faecalibacterium prausnitzii* strain was administered) to week 16 was calculated as mass (g) and percentage (%), it was observed that the weight gain slightly decreased in the silymarin-administered group and the *Faecalibacterium prausnitzii* EB-FPDK11 strain-administered group compared to the nonalcoholic steatohepatitis-induced group, but a significant decrease in the weight gain could not be found. The percent weight gain was observed to be the smallest in the *Faecalibacterium prausnitzii* EB-FPDK11-administered group compared to that in the normal diet group. Food intake and calorie intake did not significantly differ between the groups with nonalcoholic steatohepatitis induced by the experimental diet.

5.3. Changes in Glucose Tolerance (Oral Glucose Tolerance Test (OGTT))

To evaluate the effect of administration of the *Faecalibacterium prausnitzii* EB-FPDK11 strain on glucose tolerance, 16 weeks after the start of the experiment, glucose (2 g/kg) were orally administered to the mice in a state in which the mice were fasted for 18 hours. Immediately before glucose administration and 30, 60, 90 and 120 minutes after glucose administration, blood was collected from the tail vein and blood glucose levels were measured with a glucometer. The results of the measurement are shown in FIG. 13.

Figure 13:
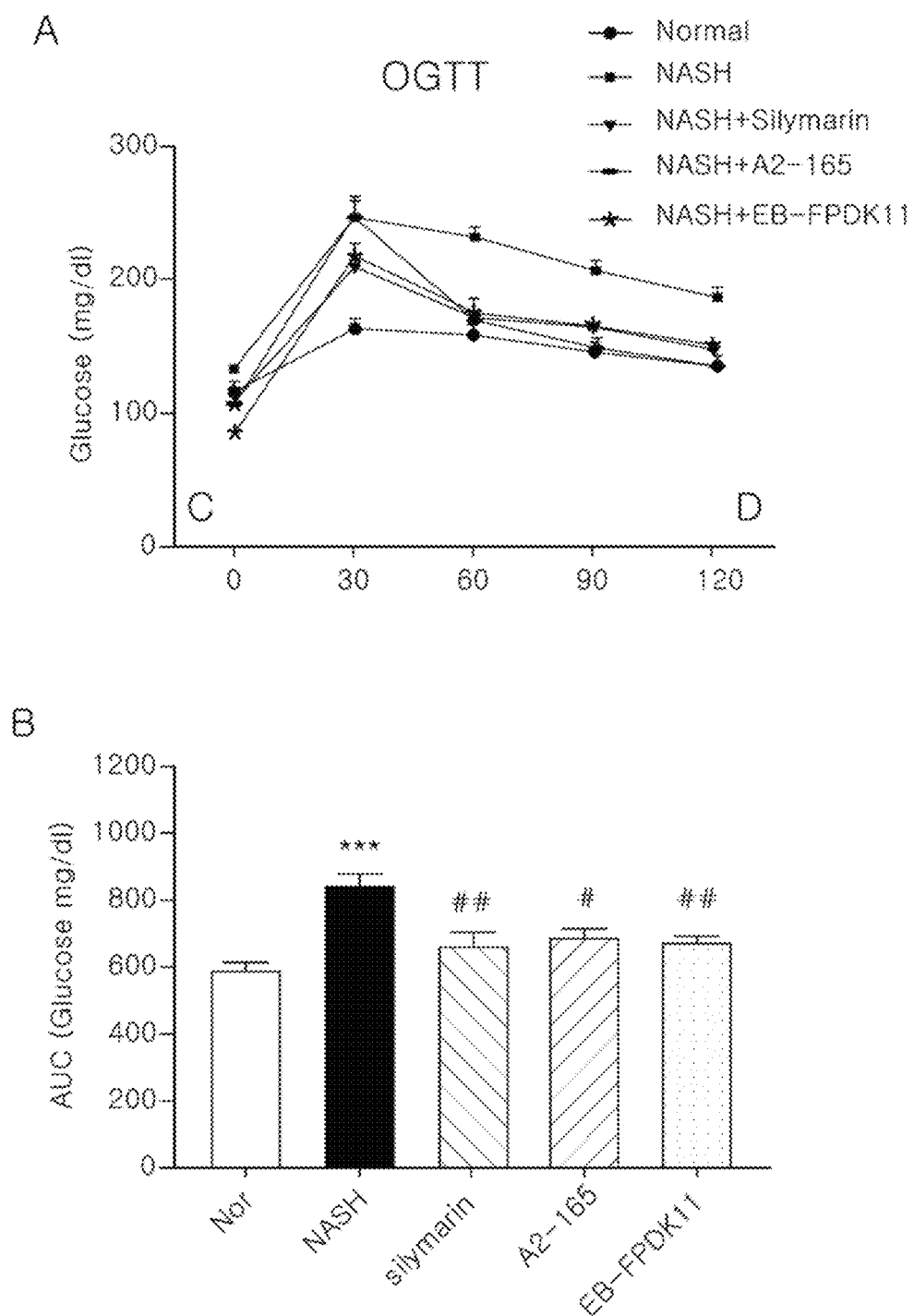
FIG. 13 depicts graphs comparing glucose tolerance between *F. prausnitzii* standard strain-administered mice and EB-FPDK11-administered mice in nonalcoholic steatohepatitis-induced mice.

Referring to FIG. 13, the group to which the *Faecalibacterium prausnitzii* EB-FPDK11 strain was administered immediately before glucose administration showed the greatest decrease in the blood glucose level among the administered groups. 30 Minutes after glucose administration, the blood glucose level increased in all the administered groups compared to the normal diet group, but as a result of calculating the area under the curve (AUC) of the blood glucose level for 120 minutes, the blood glucose level significantly decreased in the silymarin-administered or *Faecalibacterium prausnitzii* A2-165 standard strain-administered or EB-FPDK11 strain-administered group compared to the nonalcoholic steatohepatitis-induced group as the time increased to 60 minutes, 90 minutes and 120 minutes. As a result of this study, it was confirmed that oral administration of the *Faecalibacterium prausnitzii* EB-FPDK11 strain can improve the blood glucose control ability lowered by induction of nonalcoholic steatohepatitis, and can increase glucose tolerance.

5.4. Observation of Steatohepatitis and Changes in Tissue Weight

At the end of the experiment, the liver and spleen were extracted under anesthesia with $CO_2$, washed with physiological saline, and dewatered, and then weighed, and the sizes and colors thereof were visually observed.

Figure 14:
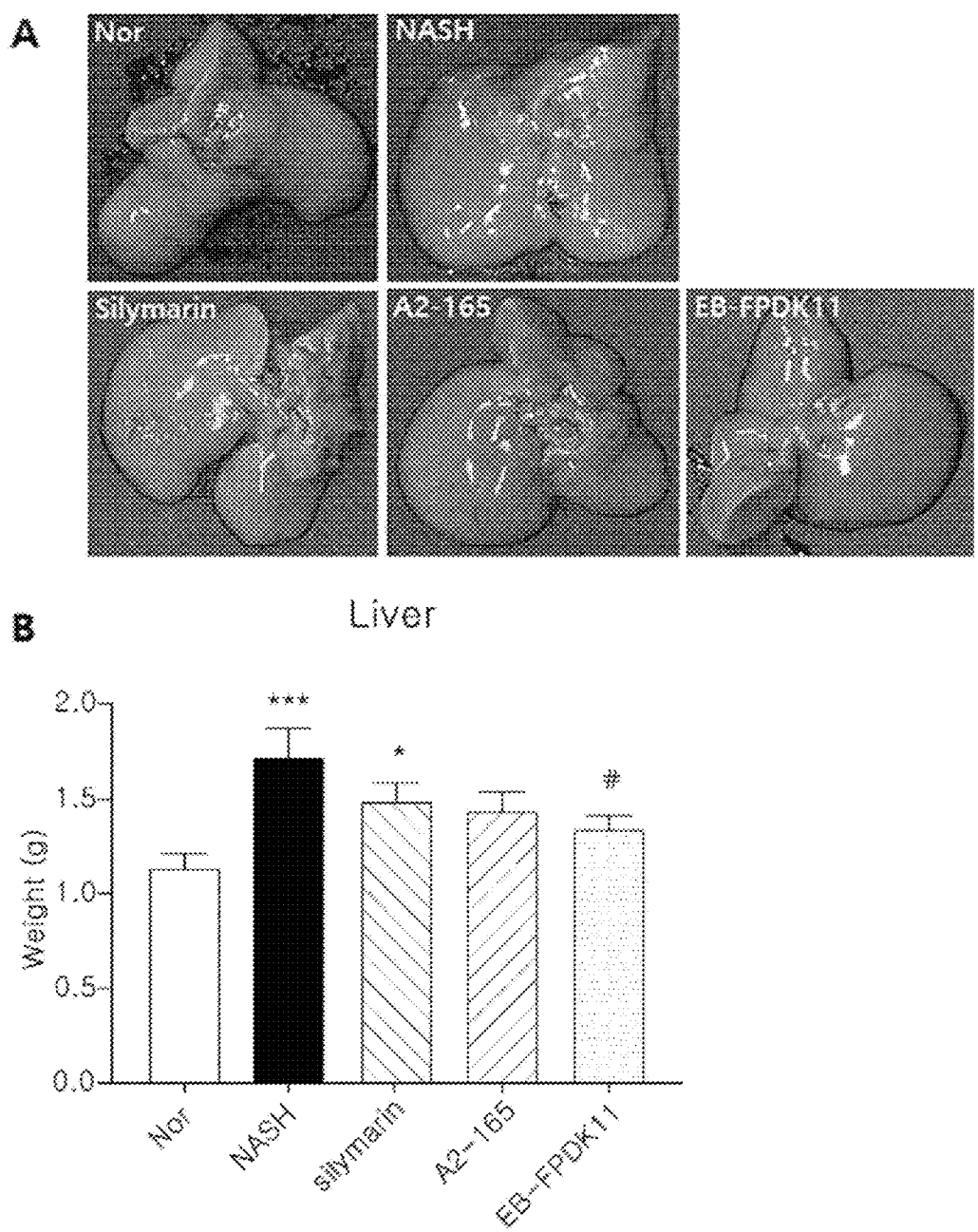
FIG. 14 is a graph comparing the liver weight and shape between *F. prausnitzii* standard strain-administered mice and EB-FPDK11-administered mice in nonalcoholic steatohepatitis-induced mice.

Referring to FIG. 14, it was observed that the liver tissue of the normal diet group showed a bright reddish healthy liver shape, whereas the liver of the group with nonalcoholic steatohepatitis induced by the experimental diet became cloudy in color due to lipid accumulation and lost the original bright reddish color. However, the silymarin-administered group, the *Faecalibacterium prausnitzii* A2-165 standard strain-administered group and the EB-FPDK11 strain-administered group showed u bright reddish liver shape close to that of the normal diet group. As a result of measuring the liver weight, the weight gain in each of the nonalcoholic steatohepatitis-induced group and the silymarin-administered group compared to the normal diet group was observed. However, the weight of the liver tissue of the *Faecalibacterium prausnitzii* EB-FPDK11-administered group was most similar to that of the normal group, and did significantly differ from that of the nonalcoholic steatohepatitis-induced group. Through the results in FIG. 14, it was confirmed that the *Faecalibacterium prausnitzii* EB-FPDK11-administered group exhibited a liver shape and weight similar to those of the normal diet group. Therefore, it could be concluded that the *Faecalibacterium prausnitzii* EB-FPDK11 strain can alleviate nonalcoholic steatohepatitis.

Figure 15:
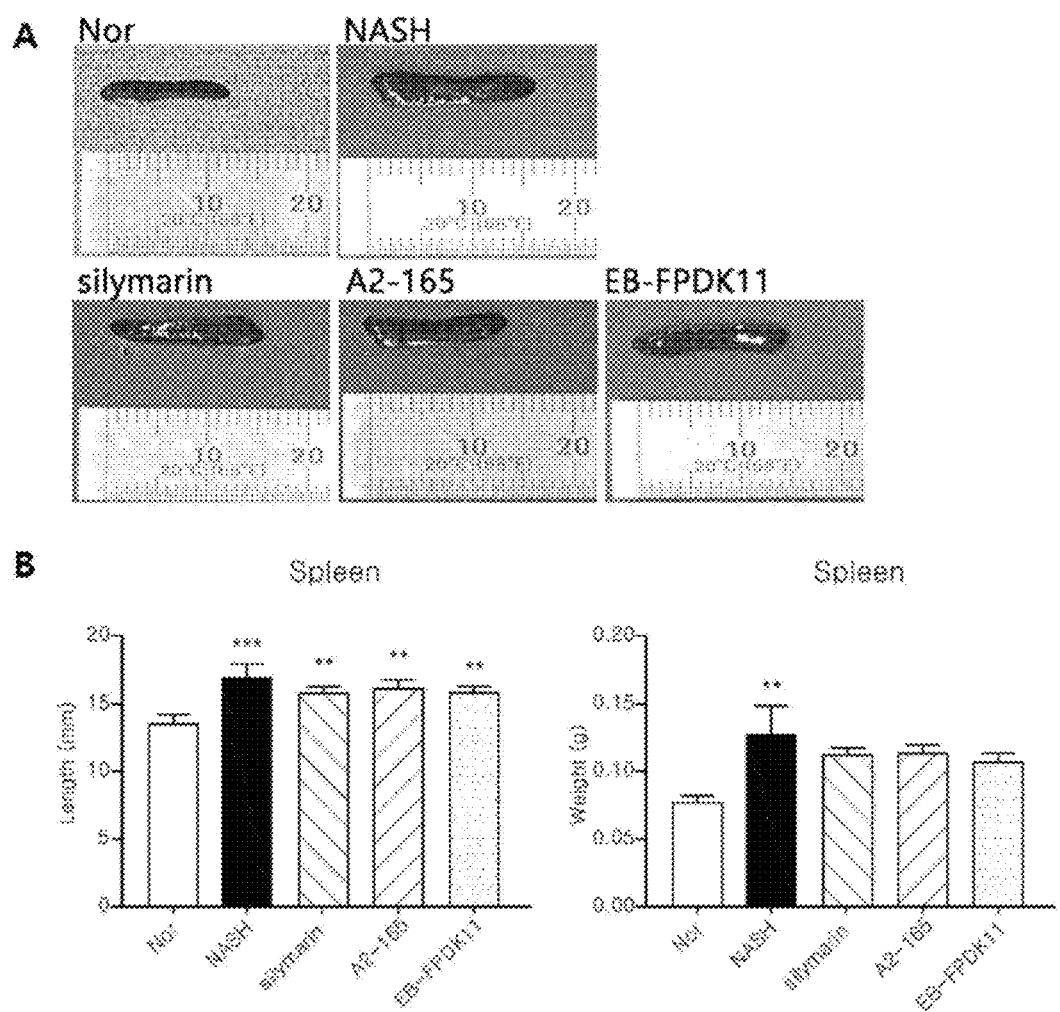
FIG. 15 is a graph comparing the spleen weight and shape between *F. prausnitzii* standard strain-administered mice and EB-FPDK11-administered mice in nonalcoholic steatohepatitis-induced mice.

As shown in FIG. 15, the length and weight of the spleen increased in the nonalcoholic steatohepatitis-induced group compared to the normal diet group. Like the case of the liver tissue, it was observed that the length of the spleen of the group treated with each of silymarin and the *Faecalibacterium prausnitzii* A2-165 standard strain also increased compared to that of the normal diet group, but the increase in the spleen length in the *Faecalibacterium prausnitzii* EB-FPDK11-administered group was so low that it was insignificant. It was confirmed that the weight of the spleen was lower than that of the non-alcoholic steatohepatitis-induced group.

5.5. Analysis of Blood Lipid Biochemical Indicators

Figure 16:
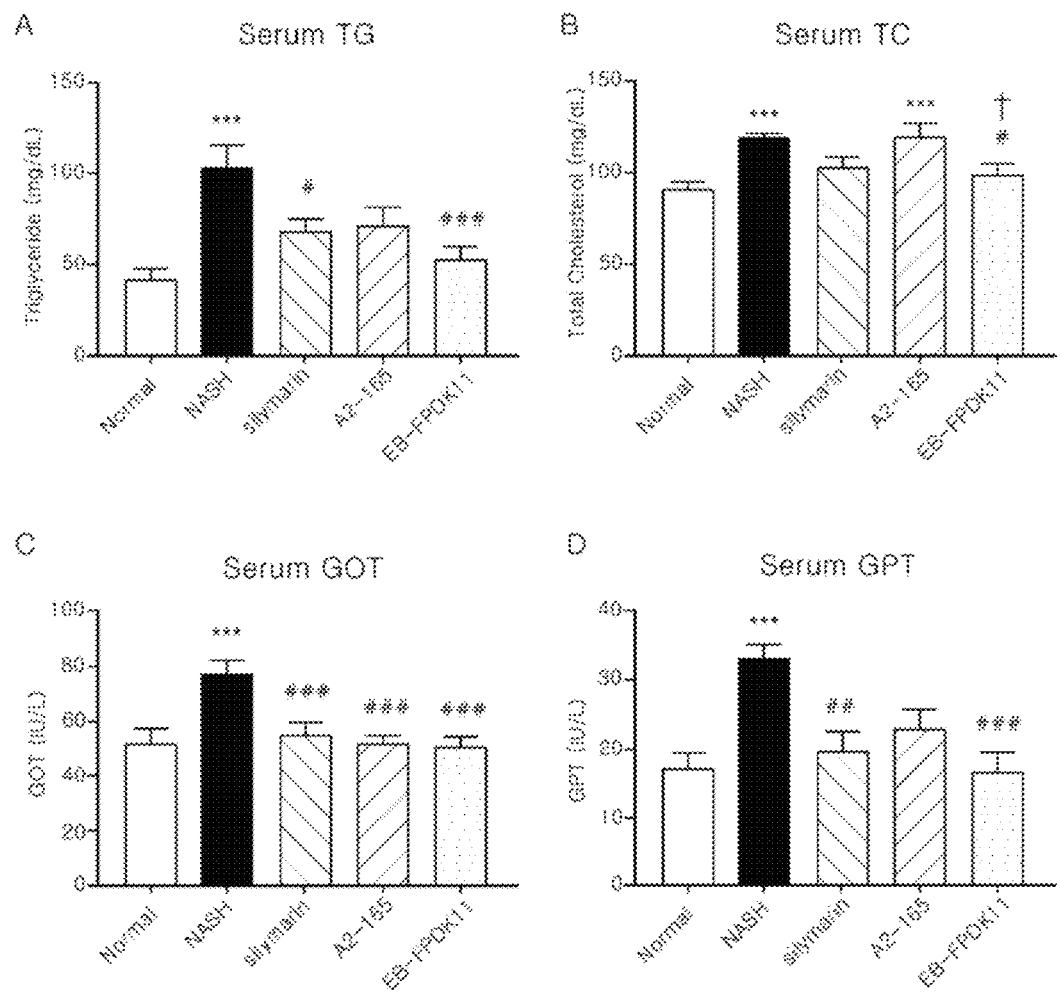
FIG. 16 depicts the results of analyzing and comparing blood lipid biochemical indicators of *F. prausnitzii* standard strain-administered mice and EB-FPDK11-administered mice in nonalcoholic steatohepatitis-induced mice.

After fasting for 18 hours, blood was collected from each experimental animal, and then the concentrations of triglyceride (TG) and total cholesterol (TC), which are indicators of lipid content, and glutamic oxaloacetic transaminase (GOT) and glutamic pyruvic transaminase (OPT), which are indicators of live function, in the serum isolated from the blood, were measured. The results of the measurement are shown in FIG. 16, The concentrations of TO, TC, GOT and OPT, which are lipid composition indicators, were all quantified using an individual measurement kit purchased from Asan Pharmaceutical Co. Ltd.

It was confirmed that the triglyceride concentration significantly increased in the nonalcoholic steatohepatitis-induced group. However, the triglyceride concentration significantly decreased in the silymarin-administered group and the EB-FPDK11 strain-administered group compared to the nonalcoholic steatohepatitis-induced group. The total cholesterol level was higher in the nonalcoholic steatohepatitis-induced group and the A2-165 standard strain-treated group compared to the normal group. However, the total cholesterol level significantly decreased in the EB-FPDK11 strain-treated group compared to the nonalcoholic steatohepatitis-induced group and the A2-165 standard strain-treated group. It was observed that the GOT concentration indicating the degree of hepatocellular damage decreased in all the administered groups compared to the nonalcoholic steatohepatitis-induced group, and that the OPT concentration significantly decreased only in the silymarin-administered group and the EB-FPDK11 strain-administered group. Through the analysis of blood lipid biochemical indicators, it was confirmed that the concentrations of triglycerides, total cholesterol, GOT, and GPT, which are closely related to nonalcoholic steatohepatitis, were decreased by administration of the EB-FPDK11 strain.

5.6. Analysis of Pathological Severity of Steatohepatitis in Liver Tissue

In order to observe the effect of administration of the EB-FPDK11 strain on the alleviation of nonalcoholic steatohepatitis, hematoxylin & eosin (H&E) staining of liver tissue sections, and Sirius red staining that can measure liver fibrosis, were performed, and the expression of alpha-smooth muscle actin ($\alpha$-SMA), which occurs upon liver damage, was observed by staining. The liver tissue isolated from each mouse was sectioned to a thickness of about 5 µm and then embedded in paraffin, and the difference in morphological changes was observed through each staining. The degree of liver damage observed through each staining was expressed as the percent positive area (%) through the Image J Program.

Figure 17:
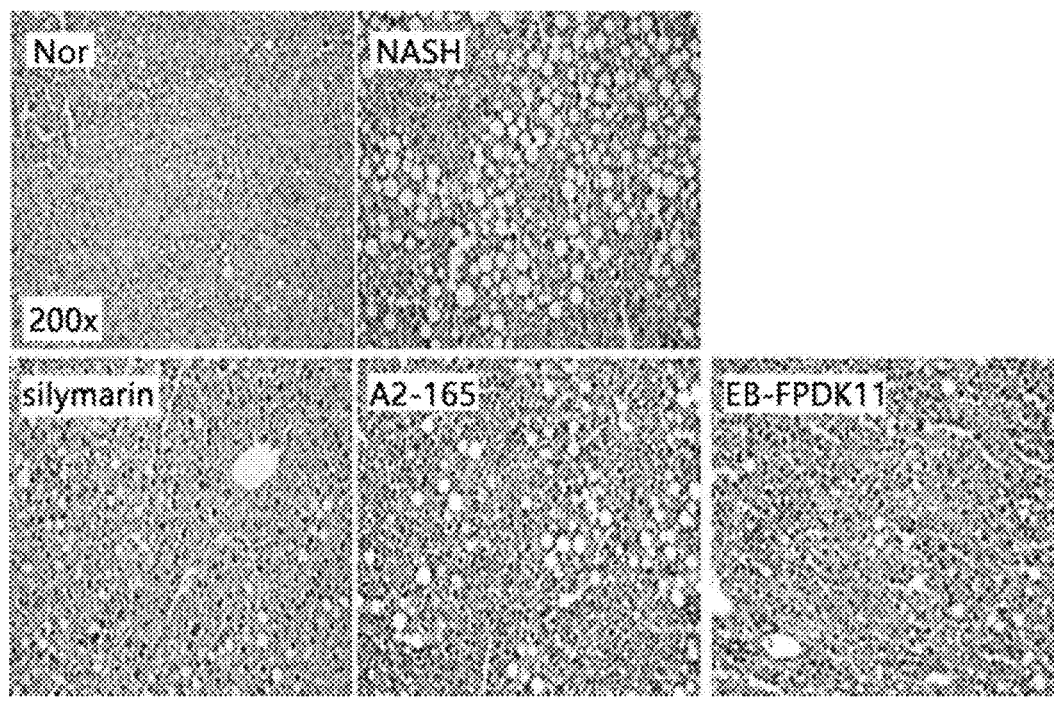
FIG. 17 shows the results of confirming the formation of fat droplets through H&E staining of the livers of *F. prausnitzii* standard strain-administered mice and EB-FPDK11-administered mice in nonalcoholic steatohepatitis-induced mice.

As shown in FIG. 17, as a result of analyzing the mouse liver tissue through H&E staining, it was observed that the liver tissue of the normal group had no fat droplet because the hepatocyte structure thereof was normally dense. However, in the liver tissue of the nonalcoholic steatohepatitis-induced mouse, the formation of a large number of fat droplets could be clearly observed compared to that in the normal group. It was observed that the formation of fat droplets decreased in all the administered groups compared to the nonalcoholic steatohepatitis-induced group, and it was confirmed that the liver tissue of each of the silymarin-administered group and the EB-FPDK11 strain-administered group was more dense, suggesting that fat droplets in these group decreased.

Figure 18:
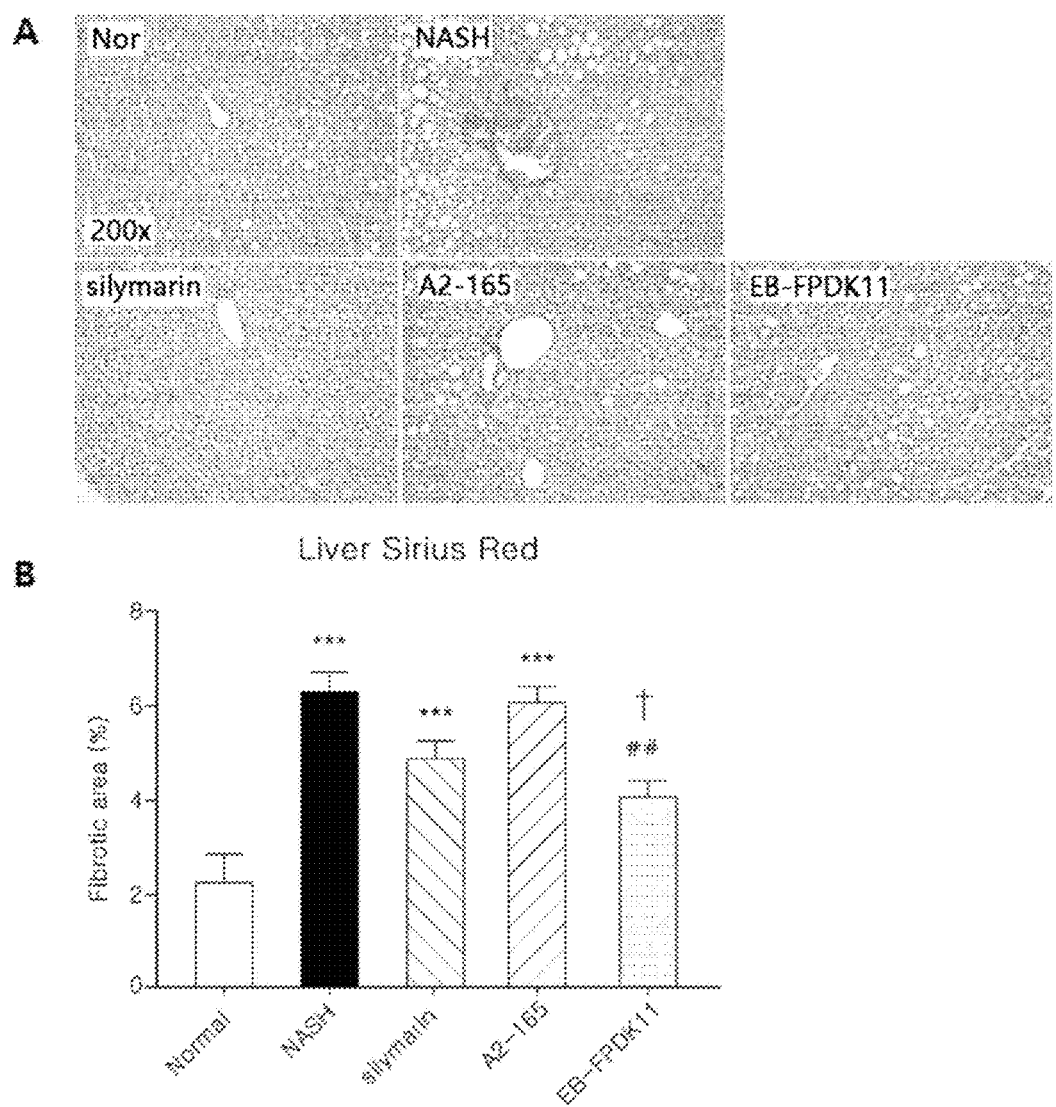
FIG. 18 shows the results of comparing collagen deposition between *P. prausnitzii* standard strain-administered mice and EB-FPDK11-administered mice in nonalcoholic steatohepatitis-induced mice.

As shown in FIG. 18, the amount of collagen deposited was analyzed through Sirius red staining of the mouse liver tissue. The amount of collagen deposited in the liver is known as a sensitive indicator that reflects the degree of fibrosis. In this experiment, liver fibrosis increased in all the nonalcoholic steatohepatitis-induced group, the silymarin-administered group and the *Faecalibacterium prausnitzii* A2-165 standard strain-administered group compared to the normal group. However, it was confirmed that collagen production was significantly inhibited in the *Faecalibacterium prausnitzii* EB-FPDK11 strain-administered group compared to the nonalcoholic steatohepatitis-induced group and the *Faecalibacterium prausnitzii* A2-165 standard strain-administered group, suggesting that liver damage caused by liver fibrosis was significantly suppressed in the *Faecalibacterium prausnitzii* EB-FPDK11 strain-administered group.

Figure 19:
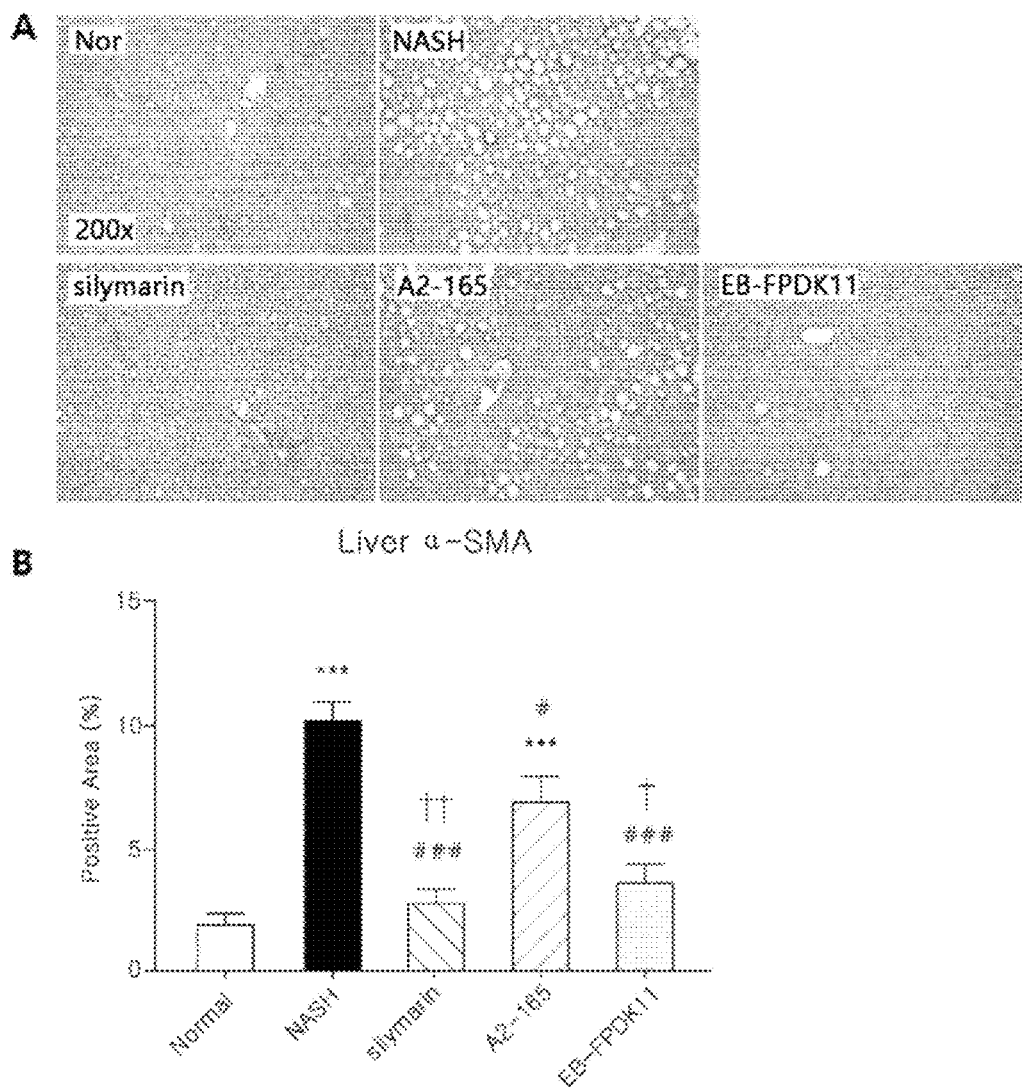
FIG. 19 shows the results of comparing the degree of liver injury through liver α-SMA between *F. prausnitzii* standard strain-administered mice and EB-FPDK11-administered mice in nonalcoholic steatohepatitis-induced mice.

In addition, as a result of observing the degree of liver damage by observing the expression of $\alpha$-SMA in mouse liver tissue through staining, as shown in FIG. 19, it was observed that the expression of $\alpha$-SMA decreased in all the administered groups compared to the nonalcoholic steatohepatitis-induced group, suggesting that liver damage in these groups was suppressed. In addition, it was confirmed that the expression of $\alpha$-SMA more significantly decreased in the silymarin-administered group and the *Faecalibacterium prausnitzii* EB-FPDK11 strain-administered group compared to the *Faecalibacterium prausnitzii* A2-165 standard strain-administered group.

5.7. Analysis of Triglycerides and Total Cholesterol Levels in Liver Tissue

Triglycerides as lipid extracts and total cholesterol in the mouse liver tissue were analyzed. 120 µl of PBS was added to 30 mg of the liver tissue which was then minced using a homogenizer, and then 320 µl of chloroform and 160 µl of MeOH were added thereto to obtain a mixture. The mixture was incubated in a shaking incubator at room temperature for one day, and then centrifuged at 2,000 rpm, and only the supernatant was separated and the solvent was evaporated therefrom. Thereafter, the supernatant from which the solvent has been evaporated was dissolved in 1 ml of isopropanol, and then quantified relative to the total liver weight of each mouse using a TG/TCS measurement kit (Asan Pharmaceutical Col., Ltd., Korea).

Figure 20:
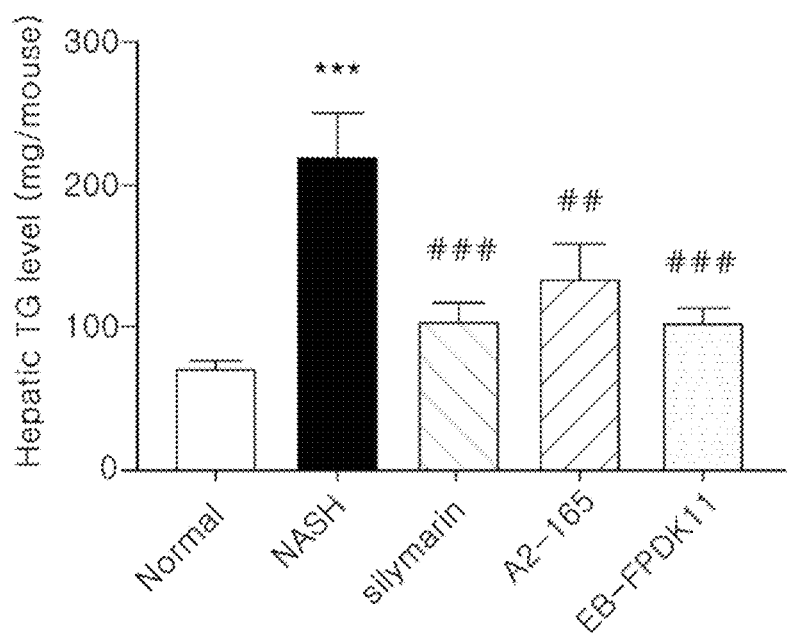
FIG. 20 shows the results of comparing hepatic triglyceride and total cholesterol levels between *F. prausnitzii* standard strain-administered mice and EB-FPDK11-administered mice in nonalcoholic steatohepatitis-induced mice.
Figure 20:
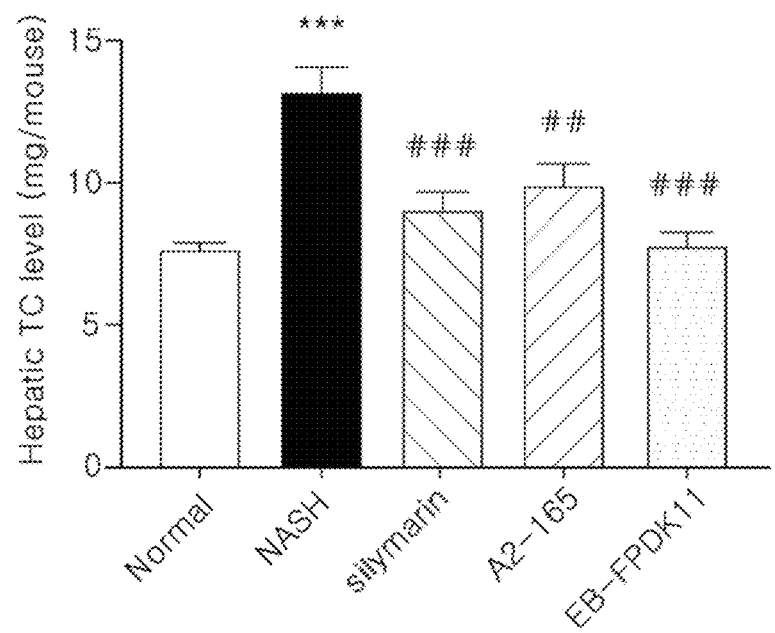

As a result, as shown in the graphs of FIG. 20, it was confirmed that the triglyceride level in the liver tissue significantly increased in the nonalcoholic steatohepatitis-induced group. However, in the silymarin-administered group, the *Faecalibacterium prausnitzii* A2-165 standard strain-administered group and the *Faecalibacterium prausnitzii* EB-FPDK11 strain-administered group, the triglyceride level significantly decreased. In addition, the total cholesterol level in the liver tissue was higher in the nonalcoholic steatohepatitis-induced group than in the normal group. However, the total cholesterol level in the liver tissue significantly decreased in the silymarin-administered group, the *Faecalibacterium prausnitzii* A2-165 standard strain-administered group and the *Faecalibacterium prausnitzii* EB-FPDK11 strain-administered group compared to the nonalcoholic steatohepatitis-induced group.

As a result of analyzing lipid accumulation in the liver tissue, it was confirmed that administration of the *Faecalibacterium prausnitzii* EB-FPDK11 strain along with silymarin most significantly inhibited the production of triglycerides and cholesterol and had the effect of ameliorating nonalcoholic steatohepatitis.

As a result of analyzing the liver tissue, it was confirmed that the progression of steatohepatitis and liver damage induced by nonalcoholic steatohepatitis was most significantly inhibited in the *Faecalibacterium prausnitzii* EB-FPDK11 strain-administered group among the administered groups.

The invention claimed is:

1. A pharmaceutical composition in the form of a powder, granule, tablet, capsule, emulsion, syrup or aerosol comprising *Faecalibacterium prausnitzii* and a pharmaceutically acceptable carrier, excipient or diluent, wherein the *F. prausnitzii* is *F. prausnitzii* EB-FPDK11 strain (accession number: KCCM12621P), a culture of the strain, a lysate of the strain, or an extract of the strain, wherein the amount of *F. prausnitzii* EB-FPDK11 strain is in the composition is $1\times10^7 \sim 1\times10^{11}$ CFU/ml.

2. The pharmaceutical composition according to claim 1, wherein the *F. prausnitzii* is *F. prausnitzii* EB-FPDK11 strain (accession number: KCCM12621P).

3. The pharmaceutical composition according to claim 1, wherein the *F. prausnitzii* is a culture of the strain.

4. The pharmaceutical composition according to claim 1, wherein the *F. prausnitzii* is a lysate of the strain.

5. A food composition in the form of a pill, powder, granule, tablet or capsule comprising *Faecalibacterium prausnitzii* and a herbal extract, food supplement additive or natural carbohydrate, wherein the *F. prausnitzii* is *F. prausnitzii* EB-FPDK11 strain (accession number: KCCM12621P), a culture of the strain, a lysate of the strain, or an extract of the strain, wherein the amount of *F. prausnitzii* EB-FPDK11 strain is in the composition is $1\times10^7 \sim 1\times10^{11}$ CFU/ml.

6. The food composition according to claim 5, wherein the *F. prausnitzii* is *F. prausnitzii* EB-FPDK11 strain (accession number: KCCM12621P).

7. The food composition according to claim 5, wherein the *F. prausnitzii* is a culture of the strain.

8. The food composition according to claim 5, wherein the *F. prausnitzii* is a lysate of the strain.

9. The pharmaceutical composition according to claim 1, wherein the *F. prausnitzii* is an extract of the strain.

10. The food composition according to claim 5, wherein the *F. prausnitzii* is an extract of the strain.

* * * * *